(12) United States Patent
Nagata

(10) Patent No.: US 6,211,480 B1
(45) Date of Patent: *Apr. 3, 2001

(54) EDM MACHINE FOR FINE HOLE AND EDM METHOD USING SUCH MACHINE

(75) Inventor: Toshiya Nagata, Tokyo (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/016,307

(22) Filed: Jan. 30, 1998

(30) Foreign Application Priority Data

Feb. 4, 1997 (JP) .................................... 9-021214

(51) Int. Cl.[7] ...................................................... B23K 1/00
(52) U.S. Cl. .................................. 219/69.11; 219/69.14; 219/69.12; 219/69.17
(58) Field of Search .................. 219/69.11, 69.14, 219/69.12, 69.17; 204/224 M, 280; 427/59

(56) References Cited

U.S. PATENT DOCUMENTS

| | | | |
|---|---|---|---|
| 4,705,932 | * 11/1987 | Aso et al. | 219/69 |
| 4,707,580 | * 11/1987 | Aso et al. | 219/69 |
| 4,977,303 | * 12/1990 | Briffod | 219/69.12 |
| 5,416,289 | * 5/1995 | Tanaka | 219/69.14 |

FOREIGN PATENT DOCUMENTS

| | | | |
|---|---|---|---|
| 27 04945 A1 | 8/1977 | (DE) | B23P/1/14 |
| 31 19660 A1 | 12/1982 | (DE) | B23P/1/12 |
| 44 33108 A1 | 3/1996 | (DE) | B23H/7/10 |
| 60-108234 | 6/1985 | (JP). | |
| 1-164526 | 6/1989 | (JP) | B23H/7/26 |
| 347972 | 7/1991 | (JP). | |
| 07285030 | 10/1995 | (JP). | |

* cited by examiner

Primary Examiner—Patrick Ryan
Assistant Examiner—M. Alexandra Elve
(74) Attorney, Agent, or Firm—Sughrue, Mion, Zinn, Macpeak & Seas, PLLC

(57) ABSTRACT

An intermediate electrode guide is disposed between an electrode guide and an electrode holder. An intermediate electrode chuck of rubber elastic body is provided on the intermediate electrode guide. The intermediate electrode chuck has an insertion hole. The hole is enlarged when a fine hole machining electrode is inserted therein so as to facilitate such insertion. On the other hand, a diameter of the hole is lessened by driving a piston when feeding the electrode or machining the workpiece. Thus, the electrode is grasped by the intermediate chuck. The chuck and the electrode are rotated via bearings 13 and 19 so as to prevent shift of the electrode.

29 Claims, 15 Drawing Sheets

EDM MACHINE FOR FINE HOLE AND EDM METHOD USING SUCH MACHINE

BACKGROUND OF THE INVENTION

1. Field of the Invention

This invention relates to an electric discharge machining (EDM) machine for fine holes and an EDM method for fine holes using such machine to process a workpiece by a fine hole machining electrode.

2. Description of the Related Art

In conventional EDM machines for fine holes using a fine solid electrode or tubular electrode, an attempt has been made to decrease deflection of a leading end of the electrode thereby to achieve precise fine hole machining.

A guide for conducting the precise fine hole machining is shown by an intermediate electrode guide mentioned in Japanese Laid Open Patent Publication No. 60-108234, a grease guide mentioned in Japanese Laid Open Patent Publication No. 1-164526, or a bearing guide mentioned in Japanese Laid Open Patent Publication No. 07-285030.

In addition, a method to decrease distortion of the machining electrode by a working fluid is exemplified by a method mentioned in Japanese Laid Open Patent Publication No. 61-76219 in which a thickener is added.

However, in these fine hole EDM machines, the machining electrodes have low rigidity since their diameter $\phi$ is not more than 0.3 mm, especially not more than 0.1 mm. Therefore, there are some problems as mentioned below when such solid or hollow electrode is used. That is, even if the intermediate guide mentioned in the publication No. 60-108234 or the like is adopted, it may be difficult to insert the electrode into the fine hole electrode guide. Moreover, it may be difficult to insert the electrode into the intermediate electrode guide or the like for reducing deflection of the electrode tip end.

When the rigidity of the electrode is not sufficient in machining, the electrode is distorted between an electrode holder and the intermediate guide or between the intermediate guide and the electrode guide in feeding the electrode, even if the intermediate guide is provided. In this case, it is hard to feed the electrode as much as required in machining. Consequently, there take place problems that a machining speed becomes slow, that a machining depth limit becomes shallow, and that a machining time increases thereby to deteriorate machining hole accuracy.

In the method of adding the thickener as in the publication No. 61-76219, a machined hole is used as a guide. Thus, it cannot solve the above problems such as the difficulty of inserting electrode into the electrode guide or the intermediate guide.

SUMMARY OF THE INVENTION

It is an object of the invention to provide an EDM machine for fine holes and an EDM method using such machine that can easily insert a fine hole machining electrode with low rigidity into an electrode guide and an intermediate electrode guide and that can improve machining accuracy by feeding the electrode as required in machining while preventing distortion of the electrode, thereby enlarging machining hole depth limit so as to improve machining accuracy of the hole.

According to one aspect of the invention, an EDM machine for a fine hole comprises a machining electrode for machining a fine hole on a workpiece by electric discharge. An electrode holder mounts the machining electrode. An electrode guide guides the machining electrode in approaching a workpiece. An intermediate electrode guide is provided between the electrode holder and the electrode guide. The intermediate electrode holder holds the machining electrode between the electrode holder and the electrode guide when the machining electrode machines the workpiece by electric discharge.

According to another aspect of the invention, an EDM machine for a fine hole comprises a machining electrode for machining a fine hole on a workpiece by electric discharge. An electrode holder mounts the machining electrode. An electrode guide guides the machining electrode in approaching a workpiece. A working fluid supply means supplies a working fluid via a pipe. An axial flow nozzle is supplied with the working fluid from the working fluid supply means via the pipe so as to form an axial flow about an axis of the machining electrode toward the electrode guide.

According to other aspect of the invention, an EDM machine for a fine hole comprises a machining electrode for machining a fine hole on a workpiece by electric discharge. An electrode holder mounts the machining electrode. An electrode guide guides the machining electrode in approaching a workpiece. A coating material coats the machining electrode except a portion thereof mounted to the electrode holder. The coating material is solid at an ordinary temperature. A coated electrode guide is provided on an upper side of the electrode guide so as to guide an end of the machining electrode coated with the coating material to the electrode guide. Heating means is provided on an upper side of the electrode guide. The heating means applies heat of not less than a melting point of the coating material to the coating material covering the machining electrode so as to melt the coating material in the coated electrode guide.

According to still other aspect of the invention, in an EDM method for a fine hole, a fine hole machining electrode is held by an intermediate electrode guide provided between an electrode holder and an electrode guide. An end of the fine hole machining electrode mounted on the electrode holder approaches toward a workpiece via the electrode guide, thereby performing an electric discharge machining. In performing the electric discharge machining, the fine hole machining electrode is held by the intermediate electrode guide so that the electrode holder, the fine hole machining electrode and the intermediate electrode guide are moved as one body.

Further objects and advantages of the invention will be apparent from the following descriptions, reference being had to the accompanying drawings, wherein preferred embodiments of the invention are clearly shown.

DESCRIPTION OF THE PREFERRED EMBODIMENTS

Figure 1:
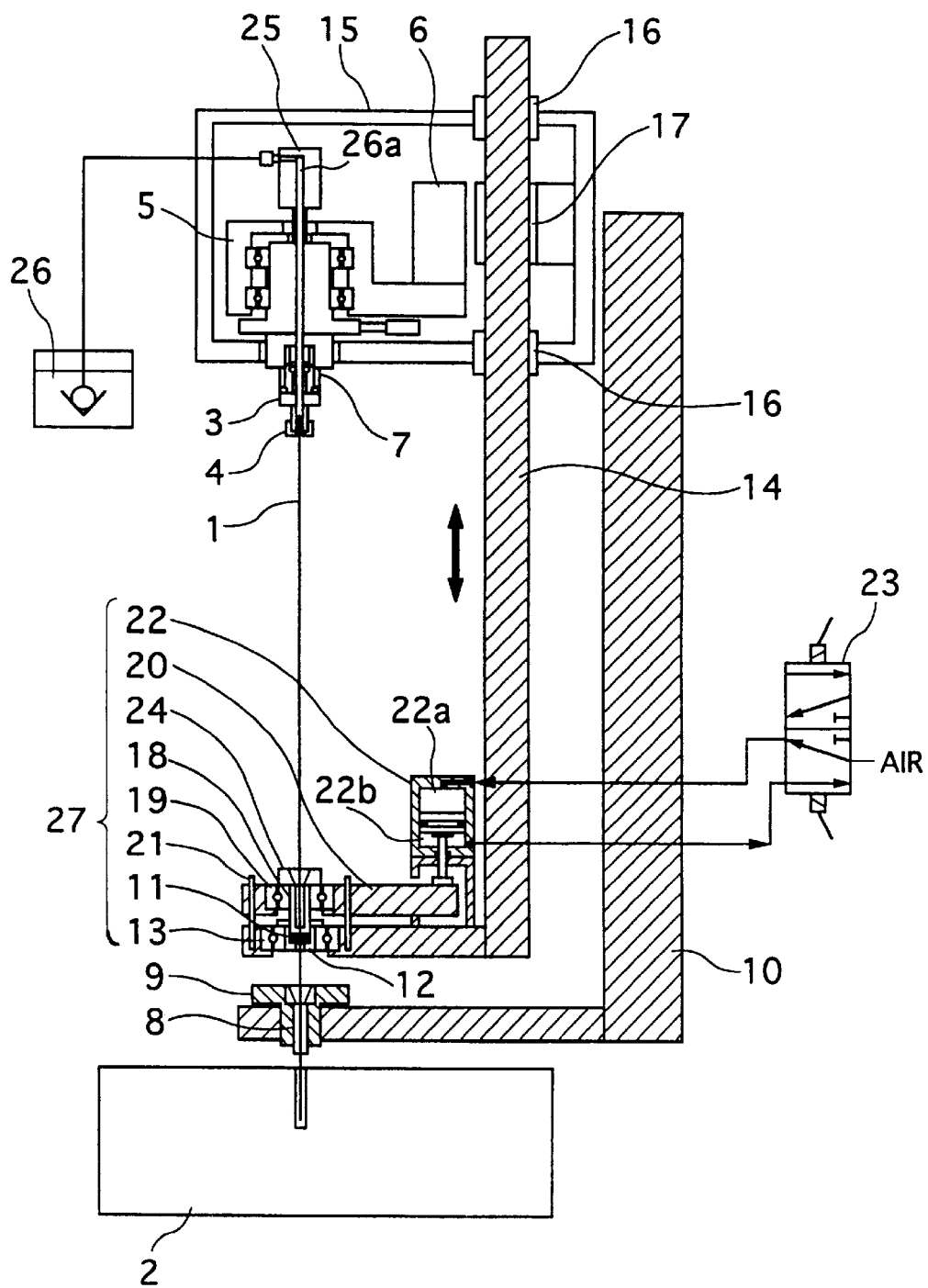
FIG. 1 is a schematic view showing a construction of a fine hole EDM machine according to a first embodiment of EDM machine of the invention.

FIG. 1 shows a construction of an EDM machine according to the first embodiment of this invention.

Referring to FIG. 1, a fine hole machining electrode 1 is shaped into a hollow or tubular shape. Its outer diameter φ is not more than 0.3 mm, particularly not more than 0.1 mm. A workpiece 2 is placed at a position opposite to the machining electrode 1. An electrode holder 3 is adapted to hold the machining electrode 1. A collet 4 is provided on the electrode holder 3 to grasp and fix the machining electrode 1 to the electrode holder 3. A spindle 5 supports and rotates the electrode 1 and the electrode holder 3. A spindle motor 6 drives the spindle 5 thereby to rotate the electrode 1 and the electrode holder 3. A clamp mechanism 4 serves to clamp the machining electrode 1 and the electrode holder 3 to the spindle 5. An electrode guide 8 is held on a guide holder 9. A guide arm 10 supports the guide holder 9. The guide holder 10 is adjustable or can change position in an axial direction of the spindle 5.

An intermediate electrode chuck 11 has a hollow cylindrical shape. The chuck 11 is made of an elasticity body such as a nitrite rubber or a fluoro-rubber or the like. The chuck 11 has a bigger inner diameter than an outer diameter of the machining electrode 1. The intermediate chuck 11 constitutes electrode holding means. An intermediate electrode chuck holder 12 carries the intermediate chuck 11. A bearing 13 supports the intermediate chuck 11 and the chuck holder 12 so that they are freely rotatable about an axis of a center bore of the bearing 13. An intermediate electrode guide arm 14 holds the intermediate chuck 11 and soon. Ahead 15 carries the spindle 5 and moves along the axis of the spindle 5. A ball bushing 16 is attached to the head 15. The ball bushing 16 holds the intermediate electrode guide arm 14 so that is movable parallel to the axis of the spindle 5. A brake 17 is supported by the head 15. The brake 17 is able to stop movement of the intermediate electrode guide arm 14. A bushing 18 is fitted into an inner wall surface of the chuck holder 12 so as to be slidable. The bushing 18 has a bigger inside diameter than an outside diameter of the machining electrode 1. The bushing 18 is disposed on an upper side of the intermediate electrode chuck 11. A bearing 19 supports the bushing 18 so that the bushing 18 is freely rotatable about its axis. A bush mounting plate 20 carries the bearing 19.

A guide pin 21 guides the bush mounting plate 20 so that it is movable parallel to the intermediate guide arm 14 and the axis of the intermediate electrode chuck. 11. A cylinder 22 has an upper chamber 22a and a lower chamber 22b. The cylinder 22 moves the bush mounting plate 20 parallel to the intermediate guide arm 14 and the axis of the intermediate chuck 11. A solenoid valve 23 is connected to the cylinder 22 via pipes. The solenoid valve 23 switches air supply and air bleeding for the upper chamber 22a and lower chamber 22b to operate the cylinder 22. An electrode guiding taper guide 24 is fixed on the bushing 18. A rotary joint 25 is attached to the axis of the spindle 5. A working fluid supply source 26 as working fluid supply means supplies the working fluid to the leading end of the machining electrode 1 through the rotary joint 25, a pipe 26a and a center hole of the hollow machining electrode 1.

An intermediate electrode guide 27 is composed of the intermediate chuck 11, intermediate holder 12, bearing 13, intermediate arm 14 and so on.

The head 15 and the intermediate arm 14 are provided with well-known drive mechanisms not shown, respectively. Thus, the head 15 and the intermediate arm 14 are movable parallel to the axis of the spindle 5, respectively.

Figure 2:
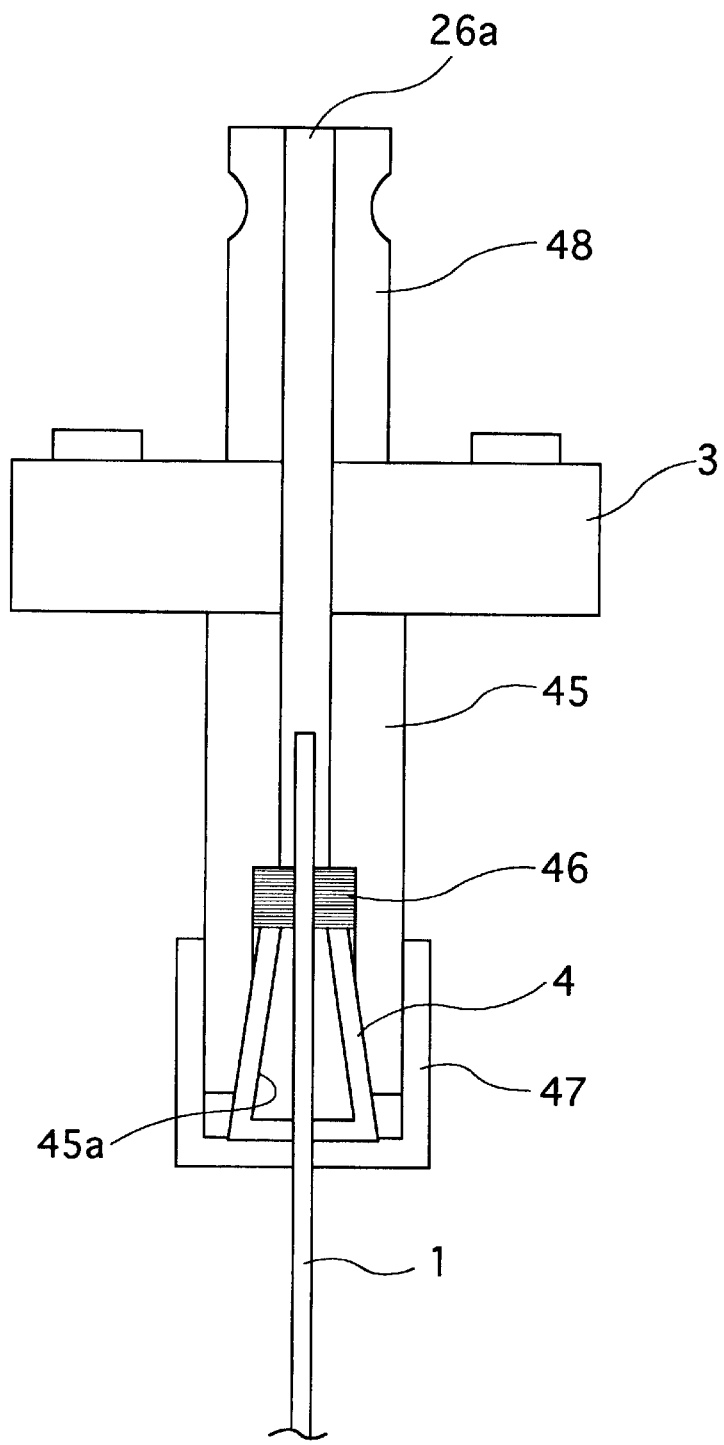
FIG. 2 is an enlarged view of a mechanism around a collet in the first embodiment of EDM machine of the invention.

FIG. 2 illustrates, in an enlarged view, a mechanism of the collet 4 and so on shown in FIG. 1. In FIG. 2, the same elements are given the same reference numerals as the elements of FIG. 1.

A collet holder 45 has a tapered portion formed at the inside of the lower end for tightening the collet 4. A seal 46 is arranged above the tapered portion inside the collet holder 45. The upper end of the electrode 1 pass through the seal 46. A nut 47 is screwed on an outer periphery of the lower end of the collet holder 45. The nut 47 forces the collet 4 upward in FIG. 2 so that it is fastened by the tapered portion of the collet holder 45. A draw bar 48 is disposed on the holder 3 or over the collet holder 45.

Figure 3:
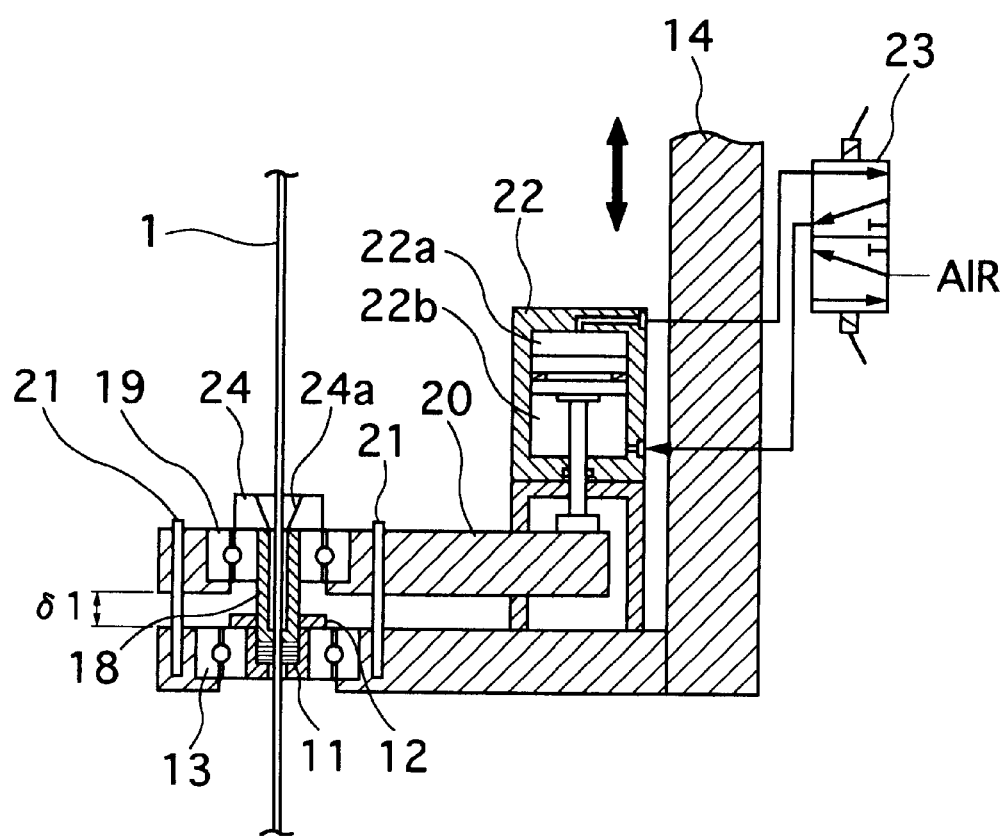
FIG. 3 is an enlarged view of a main part such as an intermediate guide in the first embodiment of EDM machine of the invention wherein the intermediate electrode guide releases the machining electrode.

FIG. 3 illustrates, in an enlarged view, a main part such as the intermediate guide 27 and so on wherein the machining electrode 1 is released from the intermediate guide 27. In FIG. 3, the same elements are given the same reference numerals as the elements of FIG. 1.

Specifically, FIG. 3 shows a state in which the air is supplied to the lower chamber 22b of the cylinder 22 via the solenoid valve 23, while the air is extracted from the upper chamber 22a. Then, the bush mounting plate 20 is moved upward, so that the bushing 18 is away from the intermediate chuck 11 and does not push it.

Thus, the intermediate chuck 11 is free of any external force or pressure in this state. Consequently, the inside diameter of the intermediate chuck 11 becomes larger than an outside diameter or outline of the machining electrode 1. The diameter of the inside surface of the intermediate chuck 11 at this time becomes larger than an inside diameter in its working state. As a result, a clearance is formed between the intermediate chuck 11 and the electrode 1, so that the intermediate chuck 11 releases the electrode 1. A distance δ1 is defined in this state between a lower surface of the bush mounting plate 20 and an upper surface of a horizontally extending lower portion of the intermediate guide arm 14.

Figure 4:
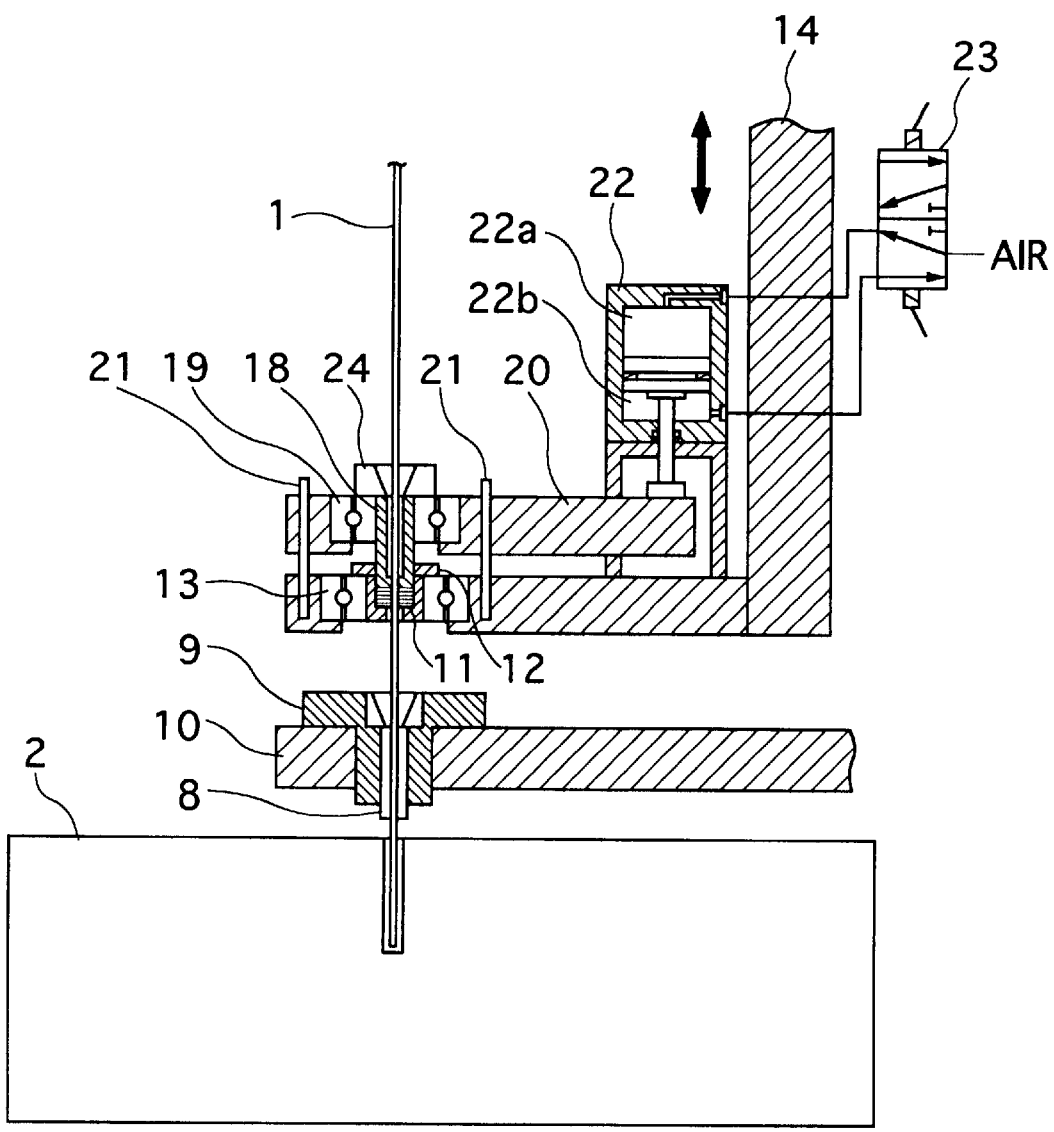
FIG. 4 is an enlarged view of a main part such as the intermediate guide in the first embodiment of EDM machine of the invention wherein the intermediate electrode guide grasps the machining electrode.

FIG. 4 illustrates, in an enlarged view, a main part such as the intermediate guide 27 and so on, in the state in which the intermediate guide 27 grasps the machining electrode 1.

Specifically, FIG. 4 shows a state in which the air is supplied to the upper chamber 22a of the cylinder 22 via the solenoid valve 23, while the air is extracted from the lower chamber 22b. Then, the bush mounting plate 20 is moved downward from the position of FIG. 3, so that the bushing 18 touches and pushes the intermediate chuck 11 downward.

Therefore, the intermediate chuck 11 is elastically deformed, so that its inner diameter becomes smaller than the outer shape of the machining electrode 1. Thus, as shown in FIG. 4, the electrode 1 is grasped by the intermediate chuck 11 for its machining work of the workpiece 2 and the like. At this time, when the machining electrode 1 rotates, the intermediate chuck 11 holding the machining electrode 1 is rotated via the bearings 13 and 19.

Here, provided a distance between the lower surface of the bush mounting plate 20 and the upper surface of the lower portion of the intermediate arm 14 in this state is δ2, the relation between the distances δ1 and δ2 is δ1>δ2.

FIGS. 5a to 5d diagramatically illustrates each of moving states of the EDM machine structured as above.

Figure 5A:
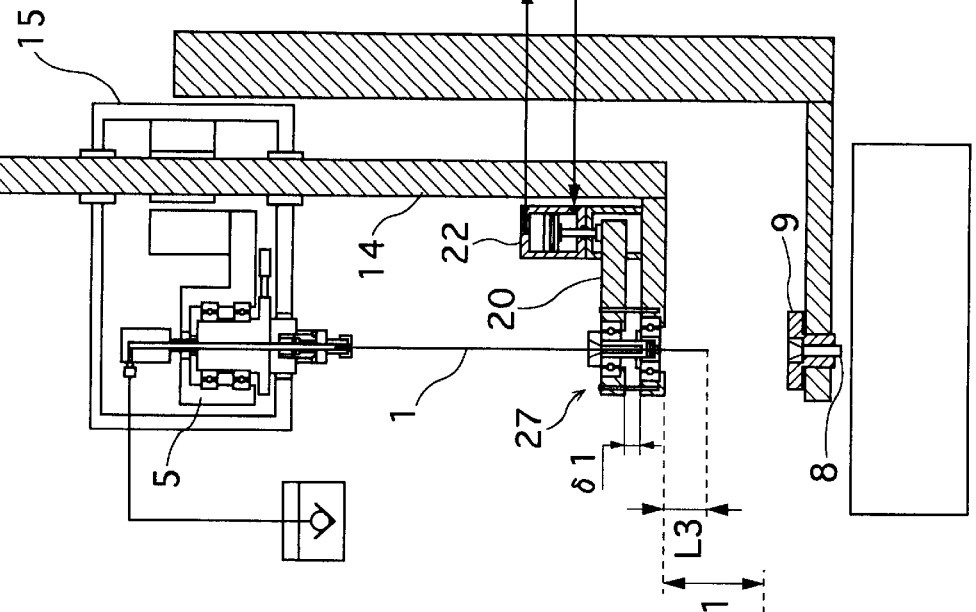
FIGS. 5a–5d schematically show an operation of the first embodiment of the EDM machine of the invention.
Figure 5B:
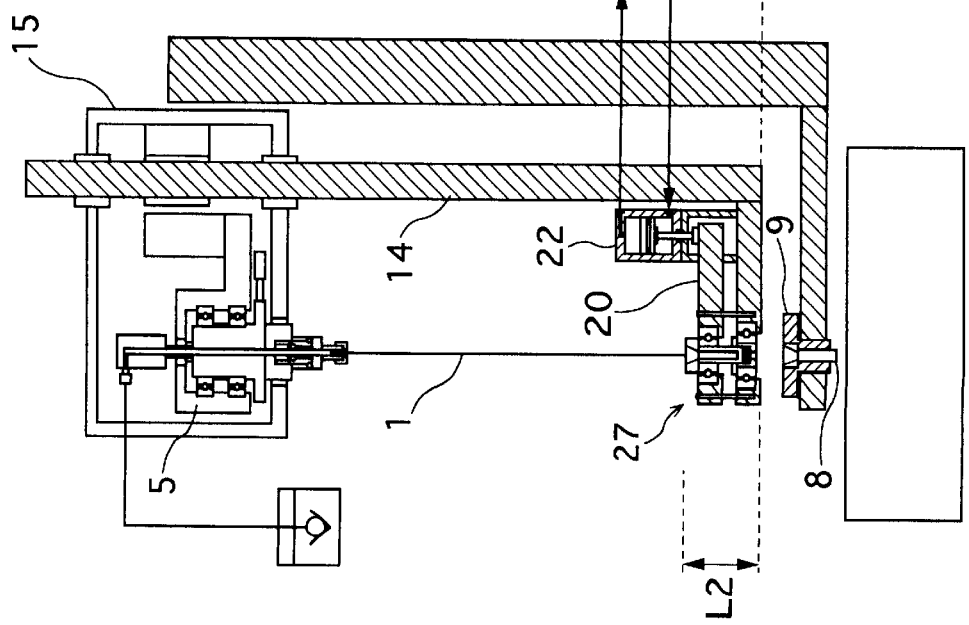
Figure 5D:
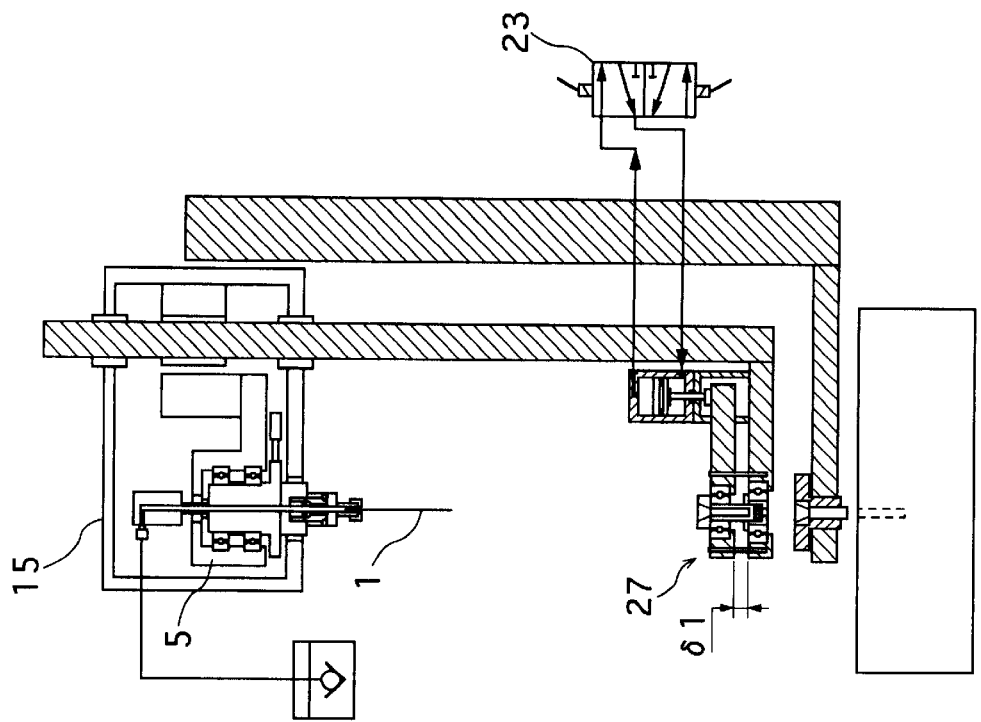
Figure 5C:
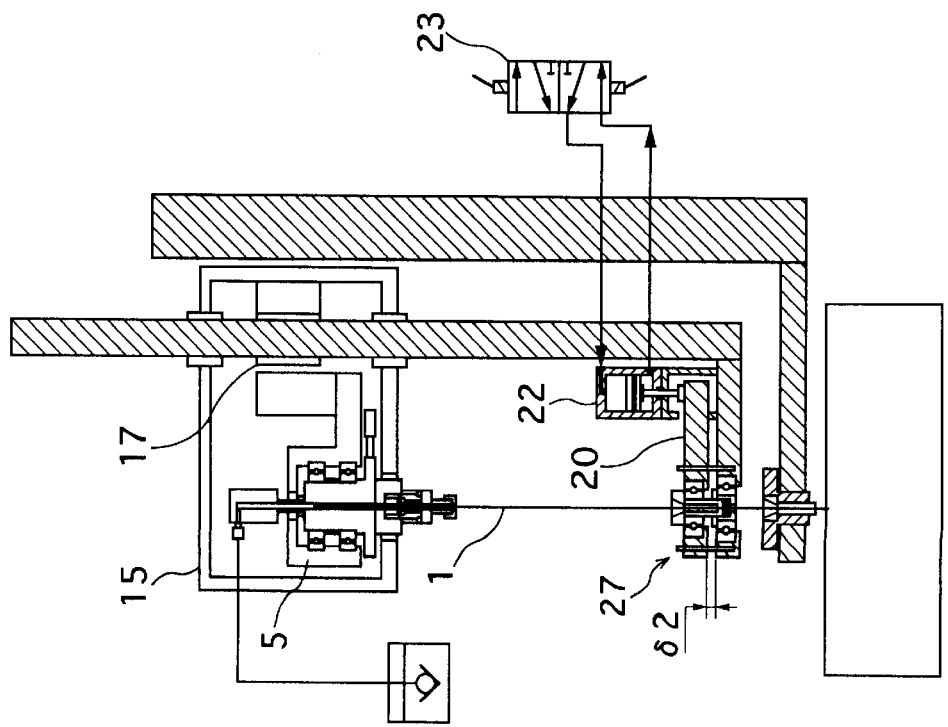

FIG. 5a shows a state when the electrode 1 is mounted. FIG. 5b shows a state when the electrode 1 is inserted into the intermediate chuck 11. FIG. 5c shows a state when the electrode 1 is inserted into the electrode guide 8 while machining the workpiece 2. FIG. 5d shows a state when the machining is finished or the electrode 1 is exchanged or the like. Details are described in each operation shown below.

Operation of first embodiment

The operation of the EDM machine according to the first embodiment will be described referring to a flowchart showing its operational procedures.

Figure 6:
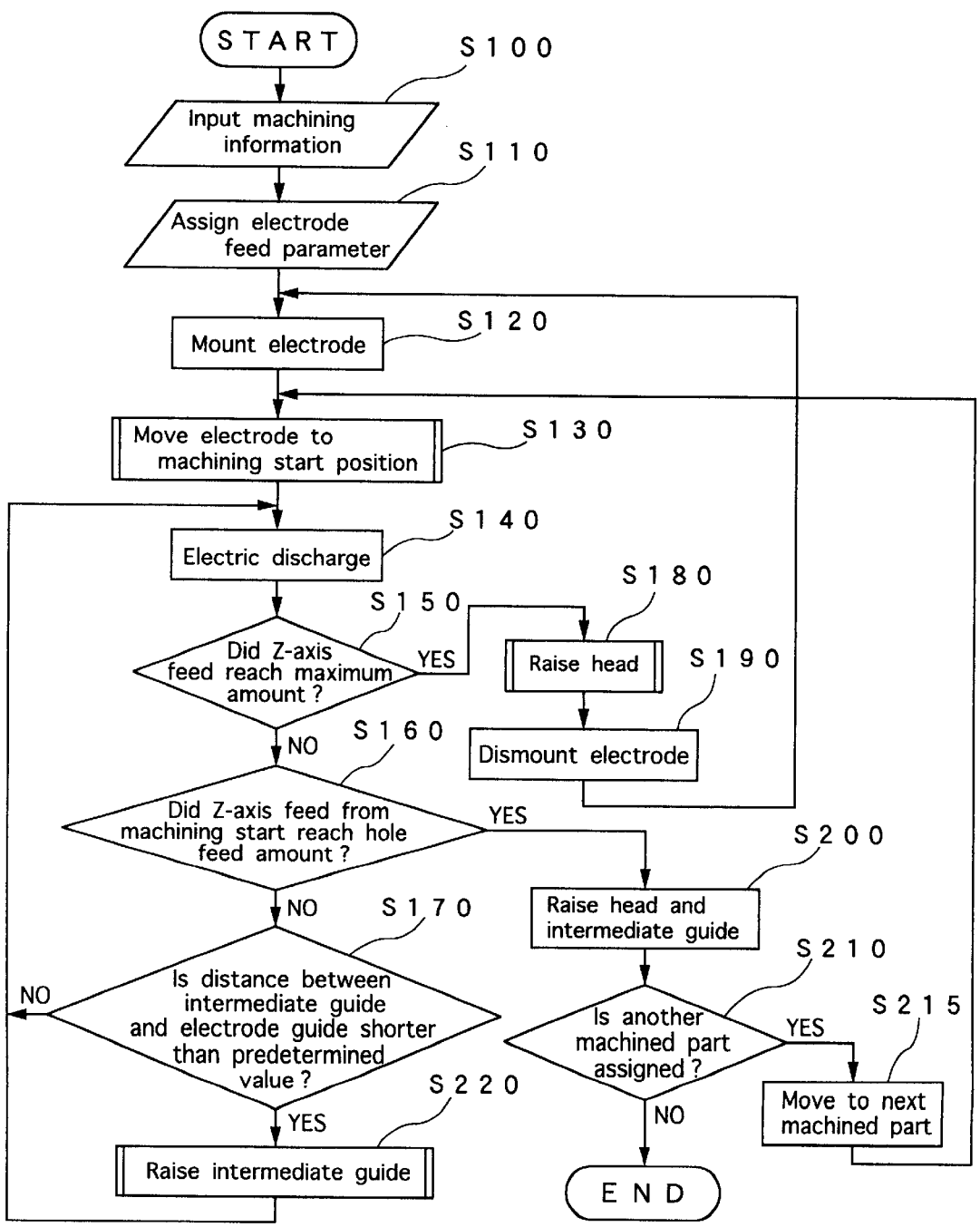
FIG. 6 is a flowchart showing a whole machining method performed by the first embodiment of EDM machine of the invention.

FIG. 6 shows a whole process of machining operation of the EDM machine by the flowchart.

When beginning the machining process, e.g. after switching on the power source, at first, the EDM machine inputs a machining information such as a machining part, a feed amount for a hole machining, a maximum feed amount and the like from a floppy disk (FD) or storage means like an internal memory not shown, in step 100. Simultaneously, the EDM machine assigns parameters such as the hole machining feed amount, maximum feed amount of the electrode 1, in step 110. The above mentioned operations are well known and conventionally conducted. An user performs these operations while displaying data on a display such as CRT not shown, confirming them and so on.

Next, the electrode 1 is mounted on the spindle 5 in an electrode mounting step, that is step 120. This step is done by attaching the electrode holder 3 with the machining electrode 1 mounted to the spindle 5. At this time, the intermediate guide 27 is at a lower position, namely, a position near the electrode guide 8, for convenience sake in mounting the electrode 1. This state is the electrode attached state shown in FIG. 5a.

Figure 7:
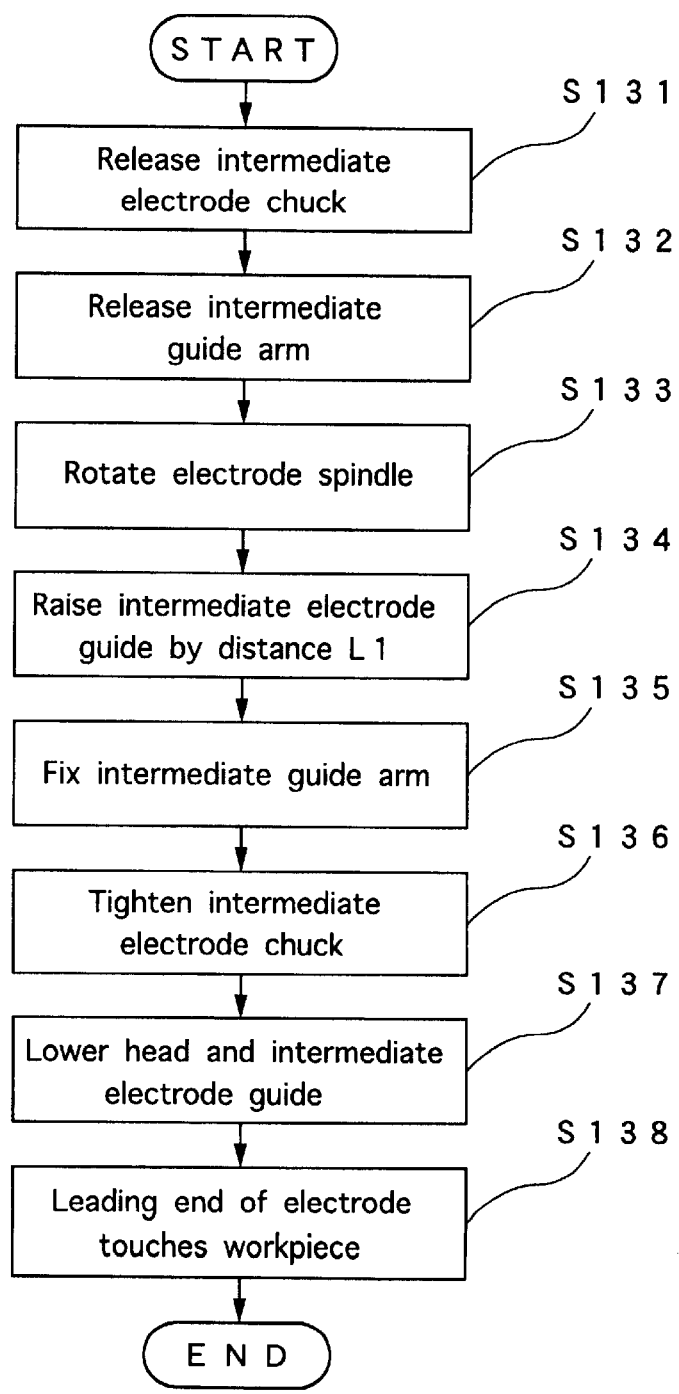
FIG. 7 is a flowchart showing, in detail a process 130 in FIG. 6.

After mounted on the spindle 5 in step 120, the machining electrode 1 is moved to a machining start position by an operation show in FIG. 7, i.e. in step 130.

FIG. 7 shows the operation of step 130 in FIG. 6 in detail.

In this operation, first of all the intermediate chuck 11 is set completely loose as shown in FIG. 3 in step 131. Specifically, as described before referring to FIG. 3, the air is supplied to the lower chamber 22b of the cylinder 22 via the solenoid valve 23, while the air is removed from the upper chamber 22a. Accordingly, the bush mounting plate 20 is moved upward, so that the bushing 18 becomes away from the intermediate chuck 11 so as not to push it. Then, since the bushing applies no pressure onto the intermediate chuck 11, the inside diameter of the intermediate chuck 11 in the normal state becomes larger than the outside diameter of the machining electrode 1. Thus, a clearance is formed between the intermediate chuck 11 and the electrode 1, so that the intermediate chuck 11 releases the electrode 1.

Next, the brake 17 releases the intermediate arm 14 in step 132. Then, the spindle 5 is rotated in step 133. Thereafter, the intermediate arm 14 is moved upward in FIG. 1 by a drive mechanism not show, in step 134. Consequently, the intermediate guide 27 is moved upward toward the head 15. Thus, the machining electrode 1 is guided into the bushing 18 by the taper guide 2 fourthereby passed through the center insertion holes of the bushing 18 and intermediate chuck 11.

At this time, the cylinder 22 is set such as to pull and fix the bush mounting plate 20 upward as shown in FIG. 3. Then, no external force is applied from the bushing 18 to the intermediate chuck 11. Simultaneously, concentric electrode insertion holes are formed through the bushing 18 and electrode guide 8, thereby defining a clearance to the machining electrode 1. Thus, the machining electrode 1 can be easily passed through the electrode insertion holes of the bushing 18 and electrode guide 8. FIG. 5b shows such a state in which the intermediate guide 27 is moved upward and the machining electrode 1 is go through the bushing 18 and intermediate chuck 11.

Here, a rising distance L1 of the intermediate guide 27 at this time is nearly a rising distance of the intermediate guide 27 in replacing the electrode 1. The distance L1 equals to an added value of a distance L2 and a moving distance L3. The distance L2 is from the end of the machining electrode 1 to the lower end surface of the intermediate guide 27 at the electrode replacing time. The moving distance L3 is a distance of one movement of the intermediate guide 27 at the time of re-gripping the machining electrode.

After the machining electrode 1 is passed through the intermediate guide 27 as shown in FIG. 5b, the intermediate arm 14 is fixed to the head 15 by activating the brake 17 in step 135. Next, the intermediate chuck 11 is operated to grasp and fasten the machining electrode 1 in step 136. Specifically, as shown in FIG. four the solenoid valve 23 is switched such that the air is sent to the upper chamber 22a of the cylinder 22 while removed from the lower chamber 22b. Accordingly, the bush mounting plate 20 is moved downward so that the bushing 18 pushes the intermediate chuck 11.

When the intermediate chuck 11 is pressed by the bushing 18, the inside diameter of the intermediate chuck 11 is made smaller as shown in FIG. fourthereby chucking the machining electrode 1. The intermediate chuck 11 should grasp the machining electrode 1 at such position as not to affect the machining operation of the machining electrode 1 on the workpiece 2 or the machining accuracy due to its distortion, since the electrode 1 protrudes from the lower end of the intermediate holder 12.

At the beginning, the wearing amount of the electrode 1 is not too much. Therefore, the length of the machining electrode 1 between the intermediate guide 27 and head 15 is longer than the protruding length of the electrode 1 from the lower end of the intermediate holder 12.

Though the machining electrode 1 is fixedly held by the intermediate holder 12, the intermediate chuck 11 and bushing 18 can rotate about their axes via the bearings 13 and 19. Therefore, the machining electrode 1 can also rotate according to the rotation of the spindle 5.

The operations of the step 135 and step 136 may be performed vice versa. Moreover, though not shown, the first embodiment of EDM machine may additionally have a rotational mechanism for the intermediate electrode chuck 11 so as to synchronize the rotation of the intermediate chuck 11 and the spindle 5.

When the arm 14 is secured by the brake 17 in step 135 and the electrode 1 is grasped by the chuck 11 in such a way as to rotate about the axis in step 136, the electrode 1, head 15, arm 14, and guide 27 can integrally move. In this state, the electrode 1, head 15, arm 14, and guide 27 are moved downward as one body, while the electrode 1 is rotated by the spindle 5. Then, the end of the machining electrode 1 is approached to the workpiece 2 via the electrode guide 8 in step 137. The end of the machining electrode 1 is finally touched to the workpiece 2 via the electrode guide 8 in step 138. Such state is shown in FIG. 5c.

In step 137 and step 138, the electrode 1, head 15 and guide 27 integrally moves downward via the arm 14, while the head fixing the upper part of the electrode 1 and the intermediate guide 27 holding the middle part thereof. Accordingly, a stress or force is hardly applied to the part of the electrode 1 between the spindle 5 and intermediate guide 27 in its axial direction. Thus, there is no shift nor distortion of the machining electrode 1.

Additionally, at the beginning, the wearing amount of the electrode 1 is little and its length between the guide 27 and head 15 is longer than its protruding length from the lower end of the intermediate holder 12. Therefore, even though a stress or force is applied to the electrode 1 in the axial direction when the electrode 1 is inserted into the electrode guide 8, the distortion of the electrode 1 can be lessened.

Consequently, the feed of the machining electrode 1 is stable, so that the workpiece 2 can be machined reliably and at high speed. Additionally, since the distortion of the machining electrode 1 is little, the machining accuracy is also improved.

After finishing the operation of step 130 of FIG. 7, the execution proceeds to step 140 in FIG. 6. In step 140, voltage is applied to the machining electrode 1 by voltage applying means not shown or the like, thereby machining the workpiece 2 by a normal electric discharge machining.

In the electric discharge machining in step 140, the head 15, arm 14 and guide 27 are interlocked and moved downward as one body so that the electrode 1 is fed downward in accordance with a machining degree in processing.

Moreover, in the electric discharge machining of step 140, several decisions are made to carry out various operations so that the machining be performed accurately. For example, in step 150, it is decided whether or not a feed amount of the electrode 1 in the axial direction or in Z-axis direction reaches the maximum feed amount. In step 160, it is decided whether or not the feed amount in Z-axis direction from the machining start reaches the hole machining feed amount. In step 170, it is decided whether or not the distance between the intermediate guide 27 and the electrode guide 8 becomes shorter than a predetermined value.

In detail, if it is decided "YES" in step 150, it means that, though the machining of the workpiece 2 is not finished, the feed amount of the electrode 1 in Z-axis direction reached the maximum feed amount. That is, the machining electrode 1 becomes short because of its wearing and it is impossible to perform machining by feeding the electrode 1 more. Therefore, for changing the machining electrode 1, the head 15 is raised in relation to the intermediate arm 14 and intermediate guide 27 by the operation of step 180 shown in FIG. 8.

Figure 8:
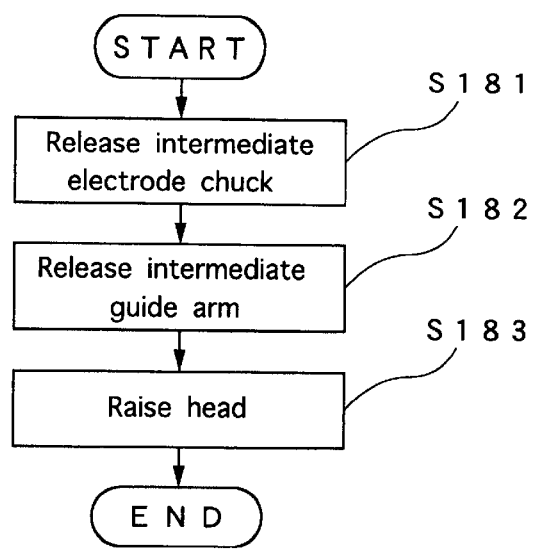
FIG. 8 is a flowchart showing, in detail, a head raising operation of a process 180 in FIG. 6.

FIG. 8 shows operations, in detail, for such head rising in step 180 of FIG. 6.

For the operation of head rising, it is necessary to raise only the head 15 while keeping the intermediate arm 14 and intermediate guide 27 at their positions. Therefore, first of all, the air is removed from the upper chamber 22a of the cylinder 22 as shown in FIG. 3 by switching the solenoid valve 23, while the air supplied to the lower chamber 22b. Then, the cylinder 22 is operated to move the bush mounting plate 20 and bushing 18 upward, so that the bushing 18 is kept apart from the intermediate chuck 11 and the intermediate chuck 11 is set loose in step 181. Next, the brake 17 which fixes the intermediate arm 14 to the head 15 is set free in step 182. Thereafter, only the head 15 is raised by a fixed distance so that at least the electrode 1 is disconnected and separated from the intermediate chuck 11 in step 183. This state is shown in FIG. 5d.

After finishing the head rising operation in step 180, the used and worn-out electrode 1 is dismounted in step 190 in FIG. 6. Then, the execution returns to the electrode mounting operation of step 120 and the machining electrode 1 is renewed. Thereafter, the operations of step 120 and following steps are again conducted from the state shown in FIG. 5a.

On the other hand, if it is decided that the feed amount in Z-axis direction does not reach the maximum feed amount ("NO" in step 150) but that the feed amount from the machining start reached the hole machining feed amount ("YES" in step 160), it means the end of the machining at the current machined part of the workpiece 2. Then, the head 15 which is fixed to the intermediate arm 14 by the brake 17 and the intermediate guide 27 at the lower part of the intermediate arm 14 are raised as one body in step 200. Accordingly, the electrode 1 fixed between the head 15 and guide 27 is also raised integrally with the head 15 and guide 27.

Next, it is decided whether or not another machining part is assigned in step 210. If another machining part is assigned ("YES" in step 210), the electrode 1 is moved to such next part assigned to be machined in step 215. Then, the execution returns again to the operation of step 130. That is, the machining electrode 1 is moved to another machining start position. Thereafter, the operations of step 130 and following steps are conducted. On the other hand, if no other machining part is assigned ("NO" in step 210), it means that the machining of all machining parts is finished. Then, the machining process shown in FIG. 6 is ended.

By the way, if it is decided that the feed amount in Z-axis direction does not reach the maximum feed amount ("NO" in step 150) and that the feed amount from the machining start does not reach the hole machining feed amount ("NO" in step 160), it means that the machining at the current machined part is not finished. Then, it is further decided whether or not the distance between the intermediate guide 27 and electrode guide 8 becomes shorter than the predetermined value in step 170.

If it is decided that the distance between the guide 27 and guide 8 is not shorter than the predetermined value ("NO" in step 170), it means that it is possible to continue machining in this state. Then, the execution returns to the electric discharge machining of step 140. On the other hand, if it is decided that the distance is shorter than the predetermined value ("YES" in step 170), it means that it is already impossible to continue machining in this state. Then, only the intermediate guide 27 is raised by the operation shown in FIG. 9 in step 220.

Figure 9:
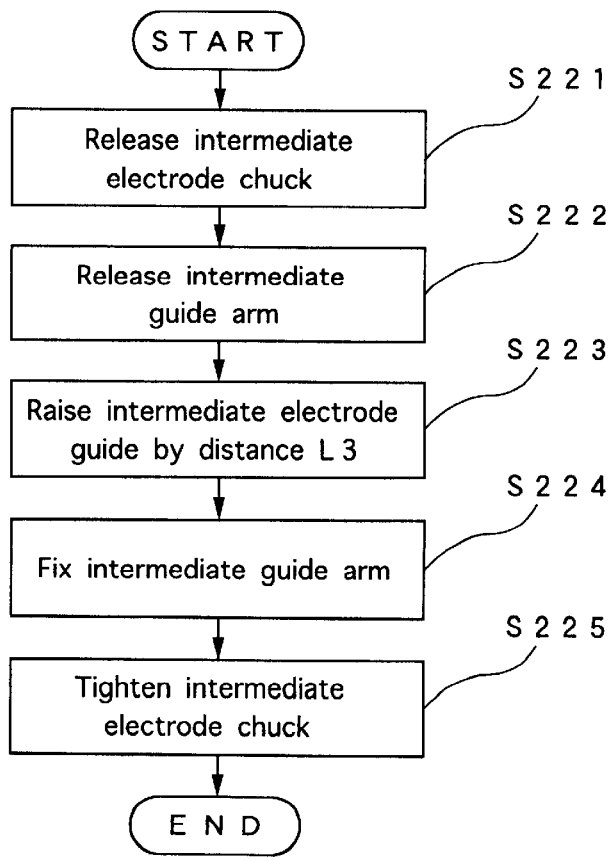
FIG. 9 is a flowchart showing, in detail, an intermediate electrode guide raising operation of a process 220 in FIG. 6.

FIG. 9 shows, in detail, the rising operation of the intermediate guide in step 220 of FIG. 6.

Such rising operation is carried out when the machining electrode 1 is worn by a long time machining. In this rising operation, the intermediate guide 27 is raised relative to the head 15 and the machining electrode 1, which is grasped by the collet 4 and the like at the lower part of the head 15. Thus, the electrode 1 increases its protruding amount from the lower surface of the intermediate guide 27. In detail, at first, the intermediate chuck 11 is set loose as shown in FIG. 3 by switching the solenoid valve 23 in step 221. Then, the brake 17 fixing the intermediate arm 14 to the head 15 is set free in step 222. Then, the head 15 is raised by the fixed distance L3 in step 223.

Thereafter, the brake 17 is operated to fix the head 15 and the intermediate arm 14 in step 224. Subsequently, the solenoid valve 23 is switched to operate the cylinder 22 so that the intermediate chuck 11 is tightened as shown in FIG. 4. so as to grasp the machining electrode 1 in step 225. Thus, the rising operation of the intermediate guide 27 is ended.

Even after the above rising operation in step 220 is ended, the electrode feed from the machining start is still under the hole machining feeding amount as shown in step 160 ("NO" in step 160). Then, the execution returns again to the operation of step 140, thereby continuing the electric discharge machining at the currently machined part, while performing the operations of step 140 and the following steps.

According to the first embodiment, the intermediate chuck 11 is provided on the intermediate guide 27 so as to freely rotate about the axis of the electrode 1, while the intermediate guide 27 is placed between the electrode guide 8 and electrode holder 3. Therefore, even in case of the machining electrode 1 with low rigidity or having an outside diameter $\phi$ of not more than 0.3 mm, especially not more than 0.1 mm, such electrode 1 can be easily inserted into the electrode guide 8 and intermediate guide 27. Moreover, it is possible to decrease the shift and distortion of the machining electrode 1 between the electrode holder 3 and intermediate guide 27 and between the intermediate guide 27 and electrode guide 8 at the time of machining. Consequently, the electrode can be fed stably and reliably as required for machining. As a result, it is possible to increase the machining speed and enlarge the machining depth limit, while improving hole machining accuracy.

Namely, since the intermediate chuck 11 of the intermediate guide 27 has enough clearance to the electrode 1 in the electrode mounting work, the electrode 1 can be easily passed through the chuck 11 of the guide 27. On the other hand, the intermediate guide 27 holds the electrode 1 at the time of machining, thereby to decrease the shift and distortion of the electrode 1. Moreover, since the electrode 1 is held by the guide 27 so as to move integrally with the head 15 and guide 27 in the feeding and machining time, the electrode 1 can be fed stably as required for machining.

Since the electrode 1 is held by the chuck 11 of the intermediate guide 27 so as to move integrally with the holder 3 and guide 27 at the machining time, the electrode 1 is prevented from shift or distortion between the holder 3 and guide 27. Moreover, in moving the leading end of the electrode 1 to the machining start position, the electrode 1 is held by the chuck 11 of the intermediate guide 27 so as to move integrally with the holder 3 and guide 27, too. Thus, the electrode 1 is prevented from shift or distortion between the holder 3 and guide 27. Furthermore, in replacing the electrode 1, the electrode 1 is released from the chuck 11 of the guide 27 and retracted from the guides 27 and 8, so that the changing work is easy. In addition, the electrode 1 is released from the chuck 11 of the guide 27 and the intermediate guide 27 is retracted from the guide 8 toward the holder 3, so that the electrode feeding work is easy.

Since the bearing 13 supports and permits the intermediate chuck 11 to rotate about the axis of the electrode 1, the distortion of the electrode 1 can be reduced. Since the chuck 11 is constituted by the elastic body like rubber, its structure is simple. Thus, it is possible to lower the manufacturing costs and decrease trouble such as malfunction of the chuck 11.

While the electrode 1 is hollow or pipe shaped in the first embodiment, it is a matter of course that the invention may use a solid machining electrode, too. Since such solid machining electrode has no center hole, the working fluid cannot be supplied to the machined part through the hole. Thus, the machining fluid is not supplied from the supply source 26 to the electrode via the spindle 5 and pipe 26a in the head 15. Instead, the machined part is directly provided with the working fluid. Otherwise, a working fluid vessel may be is used. Such modification is also applied to the other embodiments described later.

Whereas the electric discharge machining is performed while rotating the machining electrode 1 by the spindle 5 via the electrode holder 3 in the first embodiment, the electrode may not be rotated, e.g. when using a fine hole machining electrode having a non-circular cross section or the like. Such modification is also applied to the other embodiments described later.

Figure 10:
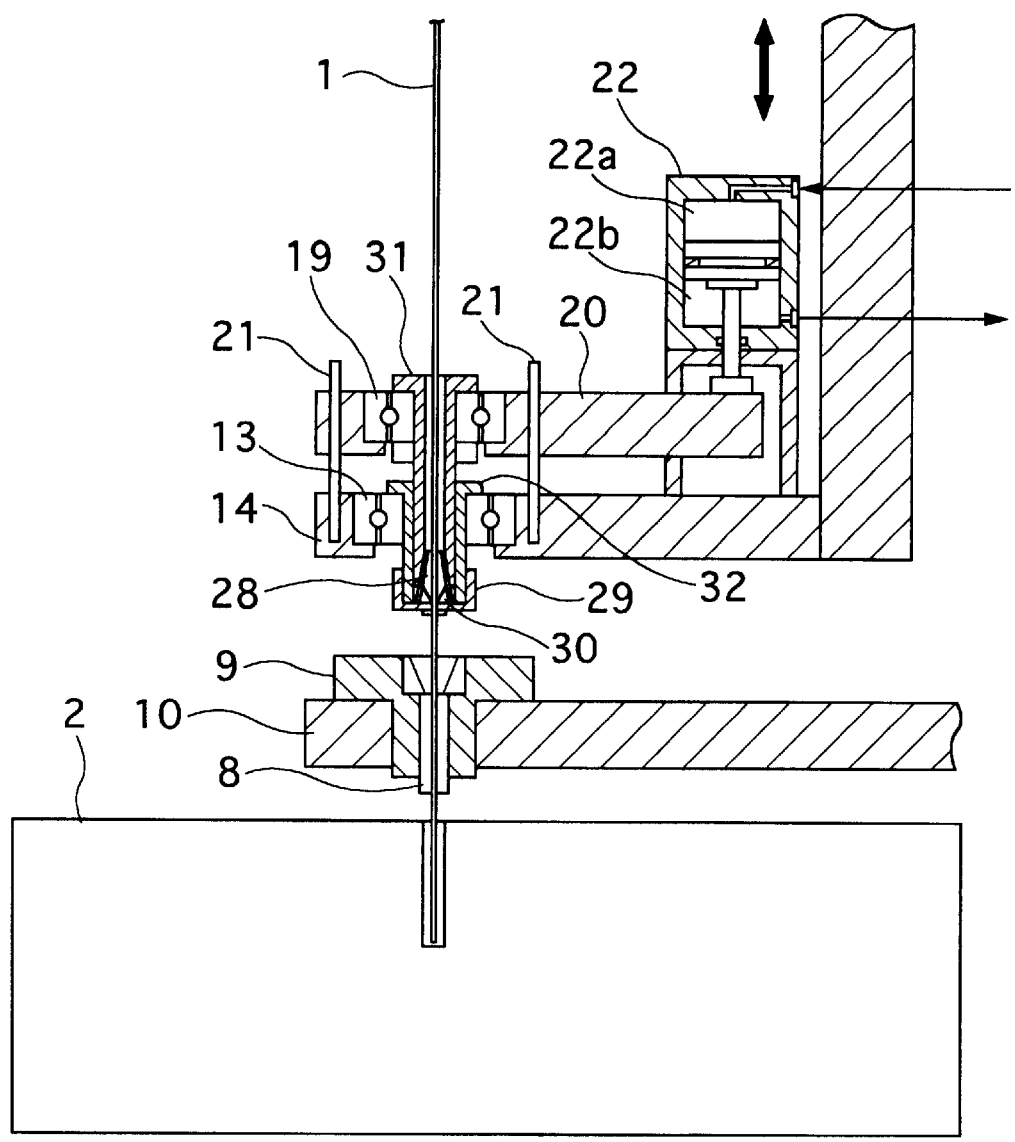
FIG. 10 is a schematic view showing a construction of a fine hole EDM machine according to a second embodiment of the invention.

FIG. 10 shows a construction of an EDM machine for fine hole according to the second embodiment of the invention.

In FIG. 10, the same components to those of the EDM machine of the first embodiment are attached with the same reference numerals to omit its description. An intermediate electrode collet 28 is arranged at the lower part of the intermediate arm 14. The intermediate collet 28 constitutes electrode holding means. A nut 29 accommodates therein the intermediate collet 28 and supports it from downside. The collet 28 has a conical shape with an upwardly tapered outer peripheral surface 28a. A downwardly tapered portion 30 is formed inside the collet 28 as an electrode guide so as to guide the leading end of the machining electrode 1 in the collet 28. A tubular collet presser 31 is inserted into the bearing 19 so that its lower end faces the collet 28. The presser 31 is movable integrally with the bush mounting plate 20 in Z-axis direction. An upwardly tapered portion 31a is formed on an inner periphery of the lower end of the collet presser 28. A sleeve 32 in inserted into the bearing 13. The nut 29 is engaged with the lower end of the sleeve 32. The lower portion of the collet presser 31 is fitted inside the sleeve 32 so as to slide in the axial direction. Thus, the inside tapered surface 31a of the collet presser 31 is adapted to face and press the outside tapered surface 28a of the collet 28, thereby tightening the collet 28. That is, the second embodiment is characterized in that the middle of the machining electrode 1 is chucked by the intermediate collet 28 instead of the intermediate chuck 11 made of elastic body.

An operation of the second embodiment of EDM machine is described below. Particularly, it is described in detail how the intermediate collet 28 grasps and releases the electrode 1 referring to the attached drawings.

Figure 11:
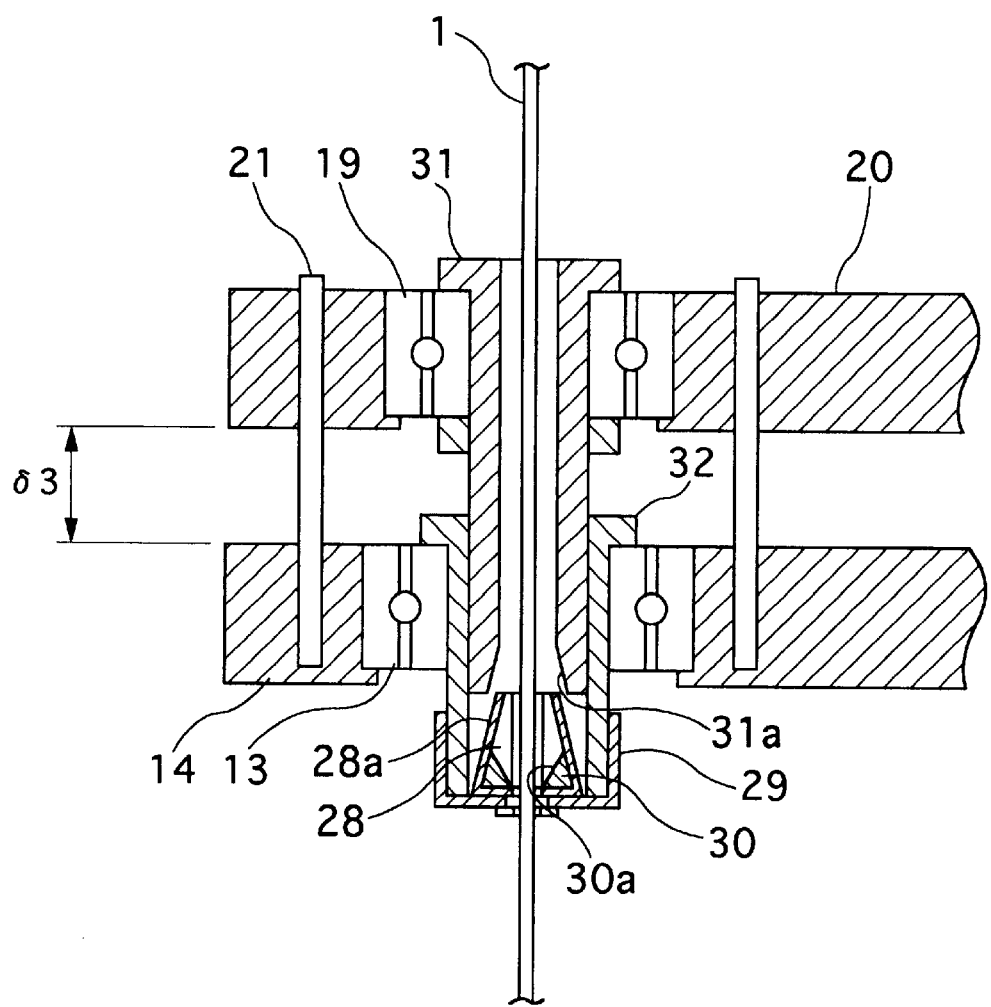
FIG. 11 is an enlarged view showing a state wherein a intermediate electrode collet releases the machining electrode.

FIG. 11 shows a state in which the machining electrode 1 is released from the intermediate collet 28.

In detail, though not illustrated in FIG. 11, the air is sent to the lower chamber 22b of the cylinder 22 via the solenoid valve 23, while removed from the upper chamber 22a, as shown in FIG. 3 in the first embodiment. Accordingly, the bush mounting plate 20 remains pulled up, so that the tapered portion 31a of the collet presser 31 is kept apart from the intermediate collet 28.

Therefore, no external force is applied to the intermediate collet 28 in such a way as to move it toward the machining electrode 1. Thus, an inside diameter of the intermediate collet 28 is remained large. Namely, the intermediate collet 28 is in the releasing state to the machining electrode 1. Consequently, the machining electrode 1 goes through the collet presser 31 and is guided to a center path of the intermediate collet 28 by the tapered surface 30a of the tapered portion 30. It is possible to pass the machining electrode 1 through the intermediate collet 28 without any resistance. Here, a distance between the lower surface of the bush mounting plate 20 and the upper surface of the lower portion of the intermediate arm 14 is defined as δ3.

Figure 12:
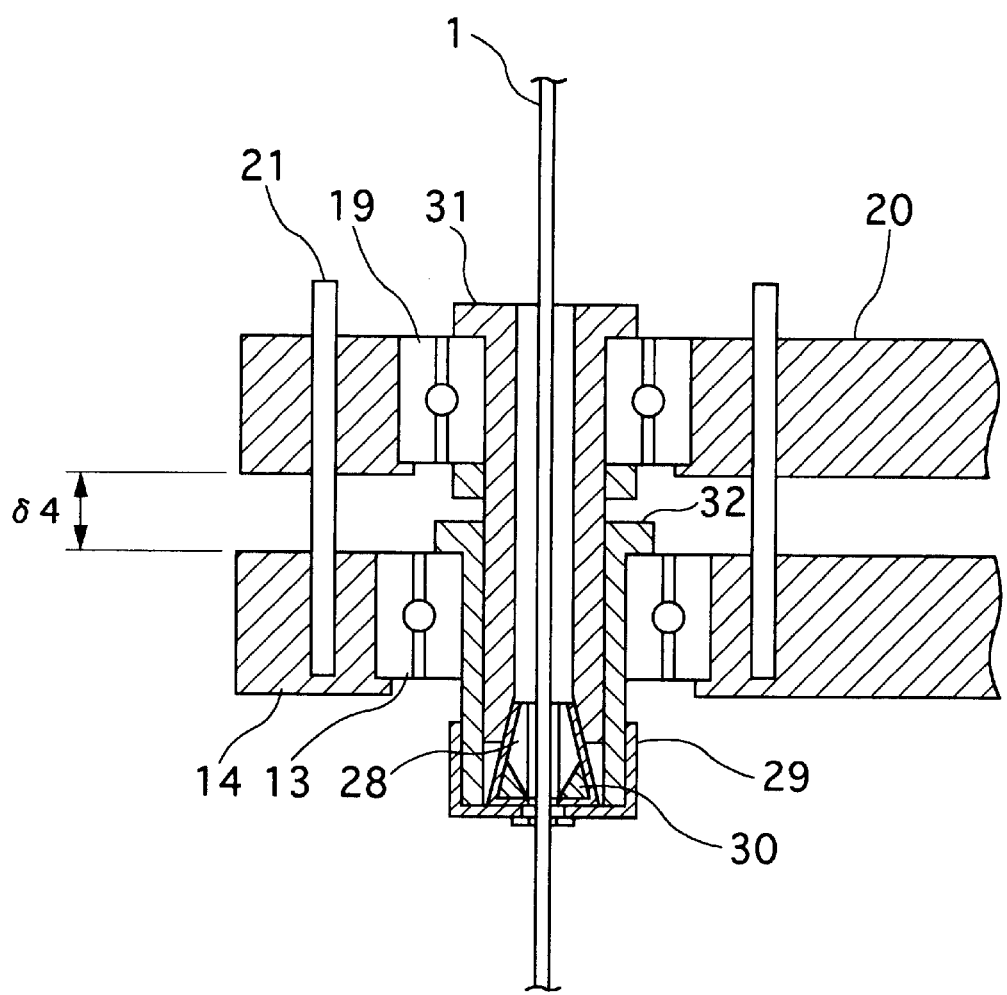
FIG. 12 is an enlarged view showing a state wherein the intermediate electrode collet grasps the machining electrode.

FIG. 12 shows a state in which the machining electrode 1 is chucked by the intermediate collet 28.

In this state, the air is supplied to the upper chamber 22a of the cylinder 22 via the solenoid valve 23, while removed from the lower chamber 22b, as shown in FIG. 4 of the first embodiment. Thus, the bush mounting plate 20 is moved downward from the position shown in FIG. 11. Accordingly, the collet presser 31 moves downward together while guided by the sleeve 32 to the position shown in FIG. 12. Thus, the collet presser 31 pushes downward the intermediate collet 28.

The collet presser 31 thus moved below presses the intermediate collet 28 by the tapered surface 31a so that the intermediate collet 28 moves or deforms inward to the axis. Thus, the inner diameter of the collet 28 is lessened, e.g. from the end thereof, so that the collet 28 immovably grasps the electrode 1. Provided a distance between the lower surface of the plate 20 and the upper surface of the lower portion of the arm 14 in this state is δ4, the relation between the distances δ3 and δ4 is δ3>δ4, as in the first embodiment.

The second embodiment simply provides the intermediate collet 28 in place of the intermediate chuck 11 of the first embodiment. The process from the electrode mounting to the machining finish is similar to the process shown in FIG. 6 to FIG. 9 of the first embodiment and the description thereof is omitted.

According to the second embodiment, the intermediate collet 28 is used instead of the intermediate chuck 11. Therefore, it is possible to decrease the shift and distortion of the machining electrode 1 between the electrode holder 3 and intermediate guide 27 and between the intermediate guide 27 and electrode guide 8 at the time of machining. Consequently, the electrode can be fed stably and reliably as required for machining. As a result, it is possible to increase the machining speed and enlarge the machining depth limit, while improving hole machining accuracy.

Moreover, since the electrode holding means is constituted by the intermediate collet 28, its structure or mechanism is simple, so that the manufacturing costs can be reduced.

Figure 13:
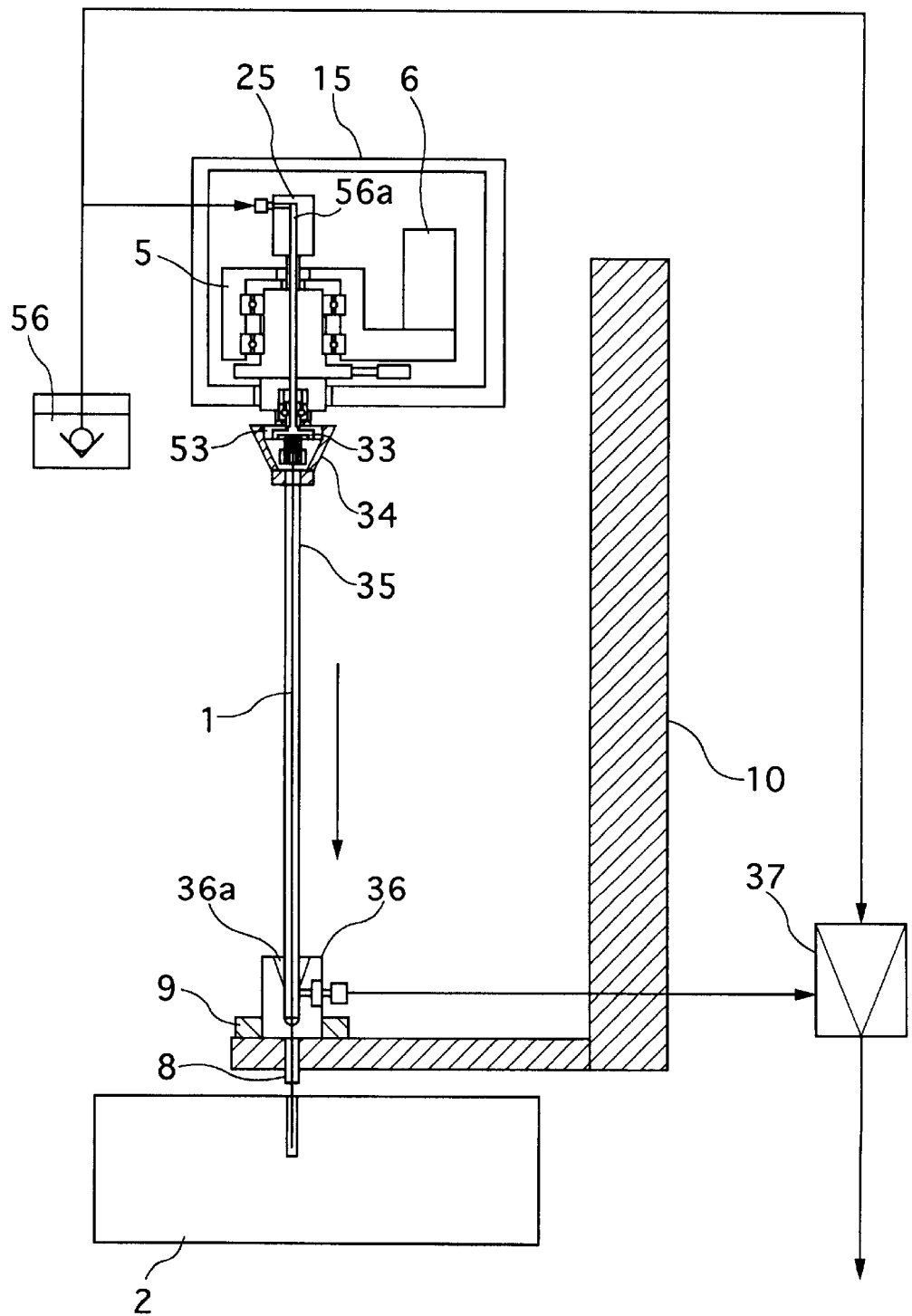
FIG. 13 is a schematic view showing a construction of a fine hole EDM machine according to a third embodiment of the invention.

FIG. 13 shows a construction of an EDM machine for fine hole according to the third embodiment of the invention.

In FIG. 13, the same components to those of the EDM machine of the first embodiment are attached with the same reference numerals to omit its description. A working fluid hole 33 is integrally provided on an electrode holder 53. An axial flow nozzle 34 has a hollow conical shape tapered downward. The nozzle 34 is screwed to a screw formed on a circumference of the electrode holder 53. Thus, the nozzle 34 is fixed to the electrode holder 53 so as to rotate together therewith. Moreover, the nozzle 34 has a discharge hole for discharging or jetting the working fluid downward. Thus, the nozzle 34 is adapted to jet the working fluid supplied from the working fluid hole 34 toward the electrode guide 8. A working fluid axial flow 35 is formed along the electrode 1 as an axis, while rectified or straightened by the nozzle 34. A working fluid collecting nozzle 36 is provided on an upper side of the electrode guide 8. An aspirator 37 is connected to the collecting nozzle 36 via a pipe. The aspirator 37 is also connected to a working fluid supply source 56 as working fluid supply means via a pipe. The aspirator 37 constitutes working fluid collecting means. The supply source 56 supplies a high-pressure working fluid from the inside space of the tubular electrode 1 and working fluid hole 33 via the rotary joint 25 and pipe 56a. The working fluid pressure is about 1.8 Mpa.

Figure 14:
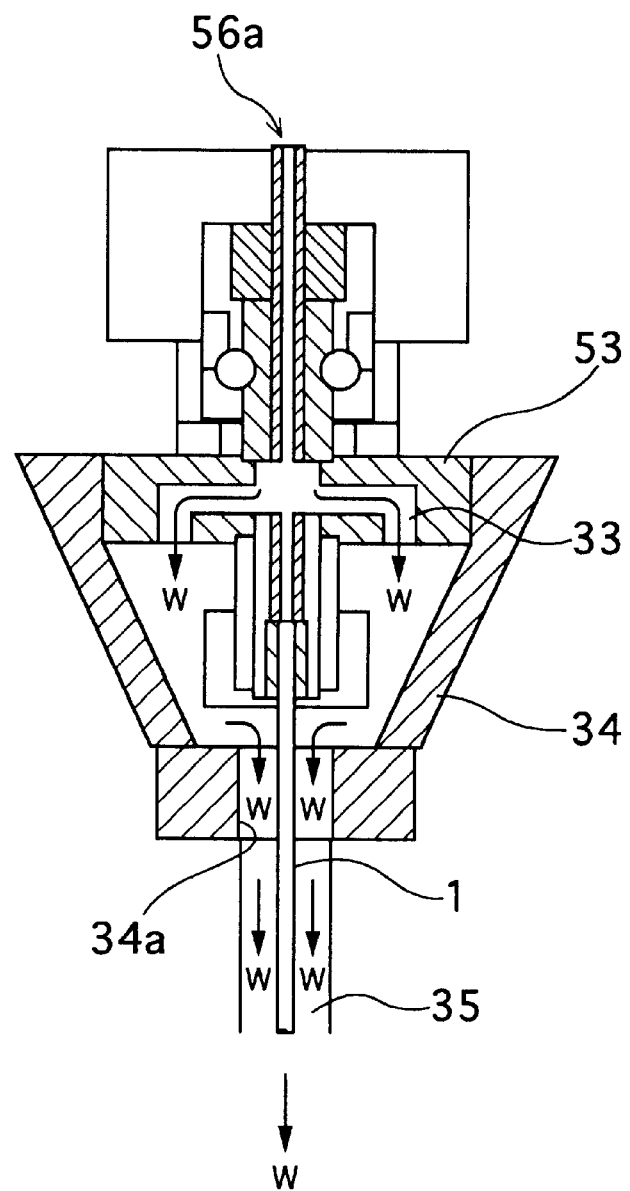
FIG. 14 is an enlarged sectional view showing an electrode holder in the third embodiment of EDM machine of the invention.

FIG. 14 illustrates a section of the electrode holder 53 in an enlarged view.

As clearly shown in FIG. 14, a working fluid W flowing in the pipe 56a is supplied into the axially extending center space of the hollow electrode 1. At the same time, the fluid is supplied into the nozzle 34 from the working fluid hole 33 of the electrode holder 53. Then, the fluid is rectified and compressed in the nozzle 34. Thus, the nozzle 34 sends out the axial flow 35 which is formed along the electrode 1 as its axis. Here, if a solid machining electrode is used, the working fluid cannot be supplied to the inside of the electrode. Still, it is enough for the operation to form the axial flow only around the outside of the machining electrode.

An operation of the EDM machine according to the third embodiment will be described below.

At first, the machining electrode 1 and nozzle 34 are attached to the electrode holder 53, before the machining operation is conducted. Such electrode holder 53 is installed on the spindle 5. Then, the spindle 5 is rotated so that the machining electrode 1 is passed through the electrode guide 8. At the same time, the head 15 is lowered. Thus, the spindle 5 equipped on the head 15 is lowered accordingly, and the machining electrode 1 approaches the electrode guide 8.

At this time, the working fluid is supplied to the spindle 5 from the supply source 56 through the pipe 56a. Then, the fluid is fed to the inside space of the machining electrode 1 via the electrode holder 53. Simultaneously, the fluid is supplied into the nozzle 34 through the hole 33.

After going through the electrode 1, the working fluid is supplied to the machined part, as in the first to third embodiments, and removes a working trash or the like. On the other hand, after supplied into the nozzle 34, the working fluid is rectified and compressed in the nozzle 34, since the working fluid pressure is about 1.8 MPa. Then, since the nozzle 34 rotates with the electrode holder 53 by the spindle 5, the working fluid becomes the rotating axial flow when going out from the nozzle 34. Thus, the fluid is sent out toward the collecting nozzle 36.

Hence, the machining electrode 1 can reach the collecting nozzle 36 while guided by the axial flow 35. Then, the electrode 1 is guided by a tapered portion 36a, which is provided at an inside of the collecting nozzle 36. Thus, the electrode 1 can reach the workpiece 2 through the electrode guide 8. The working fluid forming the axial flow is collected by the collecting nozzle 36 and sucked by the aspirator 37.

After the machining electrode 1 touches the workpiece 2, discharge voltage pulses are applied between the machining electrode 1 and workpiece 2 by a power source not shown, as in the first to third embodiments, thereby performing the electric discharge machining.

According to the third embodiment, the machining electrode 1 is guided by the axial flow 35 of the working fluid toward the electrode guide 8. Therefore, even if the rigidity of the machining electrode 1 is low, the electrode 1 has an enough apparent rigidity between the electrode holder 53 and electrode guide 8. Moreover, the electrode 1 can be inserted easily into the electrode guide 8 while guided by the axial flow 35.

Consequently, the machining electrode 1 can be stably fed in accordance with the machining state, not only at the time of inserting the electrode 1 into the electrode guide 8, but also during the machining. Therefore, the electric discharge machining can be conducted stably and at high speed. Moreover, the working fluid can be easily collected from the nozzle 36 by the aspirator 37 as the working fluid collecting means. Furthermore, the axial flow 35 is rotated along with the rotating electrode 1 by the spindle 5 as rotating means, such rotating axial flow 35 can guide the electrode 1 to the electrode guide 8 more correctly and accurately. Since the working fluid pressure supplied from the supply source 56 is about 1.8 MPa or more, the axial flow 35 can be formed toward the guide 8 without fail.

While the nozzle 34 is fixed on the electrode holder 53 which is rotated by the spindle 5 so that the axial flow formed by the nozzle 34 is also rotated in the third embodiment, this invention is not restricted thereto. Of course, the nozzle 34 may be not fixed on the rotating electrode holder 53 so that the axial flow formed by the nozzle 34 is not rotated.

Figure 15:
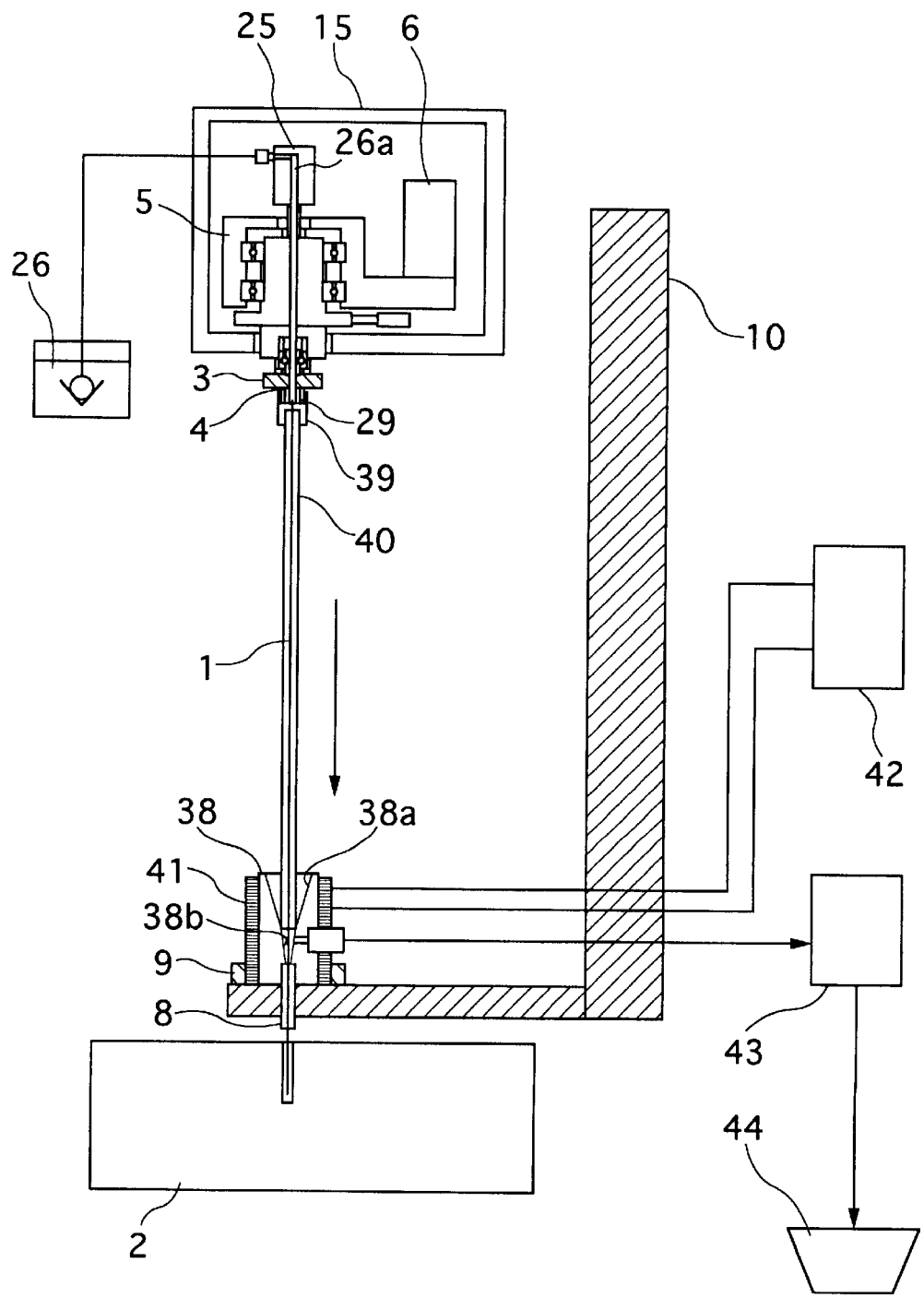
FIG. 15 is a schematic view showing a construction of a fine hole EDM machine according to a fourth embodiment of the invention.

FIG. 15 shows a construction of an EDM machine for fine hole according to the fourth embodiment of the invention.

In FIG. 15, the same components to those of the EDM machine of the first embodiment are attached with the same reference numerals to omit its description. The machining electrode 1 is covered with a coating material 40. The electrode 1 with such coating 40 is defined as "coated (machining) electrode" hereafter. A coated electrode guide 38 is attached to the upper side of the electrode guide 8. The coated electrode guide 38 guides the leading end of the electrode 1, which is exposed at the lower part of the coated machining electrode, to the electrode guide 8. A coating holder 39 is screwed into an outer circumference of the nut 29 and holds the upper end of the coated machining electrode. The coating material 40 is formed into a cylindrical shape having the machining electrode 1 embedded therein as an axis. The coating material 40 is molded by a material which is solid at a ordinary temperature but which has a low melting point, such as a paraffin or the like. A heater 41 as heating means surrounds the coated electrode guide 38. A heater power source 42 supplies power to the heater 41 to heat the coated electrode guide 38. A vacuum pump 43 is connected to the coated electrode guide 38 to suck a melted coating material 40 from the inside of the coated electrode guide. A drain tank 44 is connected to the vacuum pump 43 to store the sucked coating material 40 as drain. The vacuum pump 43 constitutes coating material collecting means.

An operation of the EDM machine according to the fourth embodiment will be described below.

The coated machining electrode is manufactured beforehand by molding the electrode 1 into the coating material 40 of cylindrical shape, while the electrode 1 defines the axis. The coating material 40 is solid at the ordinary temperature, however, it is melted into liquid with little heat because the melting point is low.

The machining electrode 1 is coated with the coating material 40 except its longitudinally opposite end portions. Thus, in the coated electrode, the electrode 1 is exposed at its both end portions. Then, the upper exposed portion of the electrode 1 is chucked by the collet 4 and mounted on the spindle 5 via the nut 29. At this time, the outer circumference of the coating material 40 is grasped by the coating holder 39 which is screwed on the outer circumference of the nut 29.

The coated machining electrode goes into the collecting nozzle 38 while guided by an upper tapered portion 38a of the nozzle 38. The collecting nozzle 38 is heated by the heater 41, so that the coating material 40 is melted into liquid in the nozzle 38.

The melted coating material 40 is gathered in the drain tank 44 from the collecting nozzle 38 by the vacuum pump 43. The machining electrode 1 with the coating material 40 removed in the collecting nozzle 38, is then guided by a lower tapered portion 38b of the nozzle 38 toward the electrode guide 8. Thus, the electrode 1 reaches the workpiece 2 through the electrode guide 8.

Then, discharge voltage pulses are applied between the machining electrode 1 and workpiece 2, thereby machining the fine hole by the electric discharge, as in the first to third embodiments. When the machining electrode 1 is worn by the machining, the head 15 is lowered or the guide arm 10 is raised, as in the first to third embodiments. At the same time, the coating material 40 is melted and removed from the periphery of the machining electrode 1 at the lower part. Then, the electrode 1 is moved and adjusted so as to protrude more from the lower end of the electrode guide 8.

According to the fourth embodiment, in machining the fine hole, the machining electrode 1 is completely covered by the coating material 40 at the portion between the collet 4 fixing the upper end and the electrode guide 8 guiding the lower end. Therefore, the electrode 1 has enough rigidity at that portion. Thus, the electrode 1 can be fed stably in accordance with the machining. Namely, the electrode 1 can be inserted easily into the guide 8, since it is given high rigidity by the coating material 40. Moreover, the coating material 40 lessens the distortion of the electrode 1 between the holder 3 and the guide 8. Furthermore, the melted coating material 40 can be easily collected by the suction pump 43 as the coating material collecting means.

While the fourth embodiment uses the paraffin as an example of the coating material, a paradichlorobenzene may be used in place of paraffin. The paradichlorobenzene is vaporized by heat in the collecting nozzle 38. Accordingly, the vacuum pump 43 and drain tank 44 are unnecessary.

The preferred embodiments described herein are therefor illustrative and not restrictive. The scope of the invention is intended to extend to variations including equivalent structure, means, and uses, such as coming within the meaning of the appended claims.

What is claimed is:

1. An electric discharge machining (EDM) machine for a fine hole comprising:

a machining electrode for machining a fine hole on a workpiece by electric discharge;

an electrode holder mounting the machining electrode;

an electrode guide guiding the machining electrode in approaching a workpiece; and an intermediate electrode guide provided between the electrode holder and the electrode guide, the intermediate electrode guide holding the machining electrode between the electrode holder and the electrode guide when the machining electrode machines the workpiece by electric discharge;

the intermediate electrode guide including electrode holding means capable of mechanically grasping and releasing the machining electrode holding means cooperating with the electrode holder so as to feed the machining electrode toward the workpiece while grasping the machining electrode.

2. An EDM for a fine hole according to claim 1, which further comprises a head mounting the electrode holder;

and in which the intermediate electrode guide includes;
an intermediate electrode guide arm provided movably toward the workpiece;
electrode holding means provided between the electrode holder and the electrode guide and at a lower end of the intermediate electrode guide arm, the electrode holding means holding the machining electrode when the machining electrode passes through the electrode holding means to be fed to the workpiece and when the machining electrode machines the workpiece by electric discharge; and
a brake provided on the head so as to fix the head and the intermediate electrode guide arm when the electrode holding means holds the machining electrode.

3. An EDM machine for a fine hole according to claim 2, which further comprises rotating means rotating the machining electrode by rotating the electrode holder; and
in which the intermediate electrode guide further includes a bearing provided at an outside of the electrode holding means so that the electrode holding means rotates about an axis of the machining electrode.

4. An EDM machine for a fine hole according to claim 2, in which the electrode holding means comprises a rubber elastic body, the rubber elastic body opening a hole larger than an outside diameter of the machining electrode in case the rubber elastic body is free from an external force, thereby passing the machining electrode through the hole, the rubber elastic body being elastically deformed and making a diameter of the hole smaller in case the external force is applied thereto, thereby holding the machining electrode passing through the hole.

5. An EDM machine for a fine hole according to claim 3, in which the electrode holding means comprises a rubber elastic body, the rubber elastic body opening a hole larger than an outside diameter of the machining electrode in case the rubber elastic body is free from an external force, thereby passing the machining electrode through the hole, the rubber elastic body being elastically deformed and making a diameter of the hole smaller in case the external force is applied thereto, thereby holding the machining electrode passing through the hole.

6. An EDM machine for a fine hole according to claim 2, in which the electrode holding means comprises an intermediate electrode collet, the intermediate electrode collet forming a path larger than an outside diameter of the machining electrode in case the intermediate electrode collet is free from an external force, thereby passing the machining electrode through the path, the intermediate electrode collet making a width of the path smaller in case the external force is applied thereto, thereby holding the machining electrode passing through the path.

7. An EDM machine for a fine hole according to claim 3, in which the electrode holding means comprises an intermediate electrode collet, the intermediate electrode collet forming a path larger than an outside diameter of the machining electrode in case the intermediate electrode collet is free from an external force, thereby passing the machining electrode through the path, the intermediate electrode collet making a width of the path smaller in case the external force is applied thereto, thereby holding the machining electrode passing through the path.

8. An electric discharge machining (EDM) machine for a fine hole comprising:
a vertically disposed machining electrode for machining a fine hole on a workpiece by electric discharge;
an electrode holder disposed at an upper position so as to grasp and fix an upper side of the machining electrode;
an electrode guide disposed at a lower position so as to guide a lower side of the machining electrode in approaching a workpiece, the workpiece being disposed under the electrode guide and machined by the machining electrode which is guided into the electrode guide and protruded downward from the electrode guide;
working fluid supply means supplying a working fluid via a pipe;
an axial flow nozzle disposed at the electrode holder, said axial flow nozzle being supplied with the working fluid from the working fluid supply means via the pipe so as to form an axial flow about an axis of the machining electrodes, flowing from the electrode holder to the electrode guide;
a working fluid collecting nozzle provided on an upper side of the electrode guide so as to receive the working fluid forming the axial flow; and
an aspirator for sucking the working fluid received in the working fluid collecting nozzle away from the working fluid collecting nozzle.

9. An EDM machine for a fine hole according to claim 8, which further comprises rotating means rotating the electrode holder so as to rotate the machining electrode therewith;
in which the electrode holder has a working fluid hole supplied with the working fluid via the pipe from the working fluid supply means; and
in which the axial flow nozzle is mounted so as to surround an outside of the electrode holder and passes the machining electrode therethrough, the axial flow nozzle having a discharge hole for discharging the working fluid supplied from the working fluid hole toward the electrode guide.

10. An EDM machine for a fine hole according to claim 8, in which a pressure of the working fluid supplied from the working fluid supply means is not less than about 1.8 MPa.

11. An EDM machine for a fine hole according to claim 9, in which a pressure of the working fluid supplied from the working fluid supply means is not less than about 1.8 MPa.

12. An electric discharge machining (EDM) machine for a fine hole comprising:
a machining electrode for machining a fine hole on a workpiece by electric discharge;
an electrode holder mounting the machining electrode;
an electrode guide guiding the machining electrode in approaching a workpiece;
a coating material coating the machining electrode except a portion thereof mounted to the electrode holder; the coating material being solid at an ordinary temperature;
a coated electrode guide provided on an upper side of the electrode guide so as to guide an end of the machining electrode coated with the coating material to the electrode guide; and
heating means provided on an upper side of the electrode guide, the heating means applying heat of not less than a melting point of the coating material to the coating material covering the machining electrode so as to melt and remove the coating material completely at the coated electrode guide.

13. An EDM machine for a fine hole according to claim 12, further comprising coating material collecting means for collecting the coating material melted the heating means.

14. An electric discharge machining (EDM) method for a fine hole, comprising the steps of:

mechanically grasping an upper end side of a fine hole machining electrode using an electrode holder, while directing a lower end of the fine hole machining electrode toward an electrode guide disposed below the electrode holder and opposing the electrode holder;

mechanically grasping a middle position of the fine hole machining electrode using an intermediate electrode guide provided between the electrode holder and the electrode guide; and feeding the fine hole machining electrode toward a workpiece disposed below the electrode guide so as to make the lower end of the fine hole machining electrode approach a workpiece via the electrode guide, thereby performing electric discharge machining;

wherein, in feeding the fine hole machining electrode toward the workpiece and performing the electric discharge machining, the fine hole machining electrode is held by the intermediate electrode guide so that the electrode holder, the fine hole machining electrode and the intermediate electrode guide are integrally moved as one body, while the lower end of the fine hole machining electrode is guided by the electrode guide.

15. An EDM method for a fine hole according to claim 14, wherein, in moving the end of the fine hole machining electrode to a machining start position, the fine hole machining electrode is held by the intermediate electrode guide so that the electrode holder, the fine hole machining electrode and the intermediate electrode guide are moved as one body.

16. An EDM method for a fine hole according to claim 14, wherein, in replacing the fine hole machining electrode in the electric discharge machining, the fine hole machining electrode is released from the intermediate electrode guide so that the electrode holder and the fine hole machining electrode are retracted from the intermediate electrode guide and the electrode guide.

17. An EDM method for a fine hole according to claim 14, wherein, if a distance between the intermediate electrode guide and the electrode guide is shorter than a fixed value in the electric discharge machining, the fine hole machining electrode is released from the intermediate electrode guide so that the intermediate electrode guide is retracted from the electrode guide and moved toward the electrode holder.

18. An electric discharge machining (EDM) machine according to claim 1, wherein the intermediate electrode guide is movable along an axis of the machining electrode between the electrode holder and the electrode guide, the intermediate electrode guide has a stricture for gripping and releasing the machining electrode, and;

wherein the intermediate electrode guide moves toward the electrode holder so as to grip the machining electrode when the machining electrode machines the workpiece by electric discharge, then the intermediate electrode guide moves toward the electrode guide together with the machining electrode, while gripping the machining electrode, so that the intermediate electrode guide guides the machining electrode into the electrode guide.

19. An electric discharge machining (EDM) machine according to claim 8, wherein the axial flow nozzle is disposed near the electrode holder so as to jet the working fluid supplied from the working fluid supply means along an outer periphery of the machining electrode, while rectifying, straightening and compressing the working fluid, thereby forming the axial flow along an axis of the machining electrode over an entire length between a base end and a leading end of the machining electrode, so that the machining electrode is guided into the electrode guide, while given higher rigidity by the axial flow.

20. An electric discharge machining (EDM) machine according to claim 12 wherein the coating material is made of a material that has a low melting point and that is solidified at an ordinary temperature; and wherein the coating material covers the machining electrode so that the machining electrode is guided into the electrode guide, while given higher rigidity by the coating material, and the coating material is melted by the heating means so as to be removed form the machining electrode and permit the machining electrode to machine the workpiece by electric discharge.

21. An electric discharge machining (EDM) machine according to claim 1, in which the electrode holding means has a bore which the machining electrode passes through, the bore having a diameter larger than an outer diameter of the machining electrode unless an external force is applied to the electrode holding means, the electrode holding means being able to lessen the diameter of the bore if external force is applied;

the intermediate electrode holder further including urging means for applying external force to the electrode holding means to lessen the diameter of the bore;

wherein, unless the urging means applies external force to the electrode holding means, the machining electrode is able to freely pass through the bore of the electrode holding means; and when the urging means applies the external force to the electrode holding means, the electrode holding means immovably grasps the machining electrode.

22. An electric discharge machining (EDM) machine according to claim 21, in which the electrode holding means comprises an intermediate electrode chuck fitted in the intermediate electrode guide, the intermediate electrode chuck being made of an elastic body of hollow cylindrical shape and the bore being formed along an axis of the intermediate electrode chuck;

wherein the urging means comprises a bushing slidably fitted in the intermediate electrode guide so as to press against the intermediate electrode chuck in an axial direction thereof;

wherein, when the bushing is slid and presses the intermediate electrode chuck, the intermediate electrode chuck is elastically deformed in a radial direction thereof so as to immovably grasp the machining electrode.

23. An electric discharge machining (EDM) machine according to claim 21, in which the electrode holding means comprises an intermediate electrode collet fitted in the intermediate electrode guide, the intermediate electrode collet having a hollow conical shape with a tapered outer peripheral surface and the bore being formed along an axis of the intermediate electrode collet;

wherein the urging means comprises a tubular collet presser slidably fitted in the intermediate electrode guide, the collet presser having a tapered inner peripheral surface corresponding to the tapered outer peripheral surface of the intermediate electrode collet;

wherein, when the collet presser is slid toward the intermediate electrode collet, the tapered inner peripheral surface of the collet presser is engaged with the tapered outer peripheral surface of the intermediate electrode collet so as to push the intermediate electrode collet in a radial direction so that the intermediate electrode collet is elastically deformed in the radial direction so as to immovably grasp the machining electrode.

24. An electric discharge machining (EDM) machine according to claim 21, further comprising rotating means for rotating the machining electrode around the axis; and the intermediate electrode guide further comprising a bearing which supports the electrode holding means so as to permit the electrode holding means to rotate synchronously with the machining electrode when the electrode holding means grasps the machining electrode.

25. An electric discharge machining (EDM) machine according to claim 1, further comprising:

first drive means for moving the electrode holder along the axis of the electrode;

second drive means for moving the intermediate electrode guide along the axis of the electrode; and control means for controlling the first and second drive means so that the intermediate electrode guide reciprocates between the electrode holder and the electrode guide so as to grasp a leading end of the machining electrode and move and guide the leading end of the machining electrode into the electrode guide.

26. An electric discharge machining (EDM) machine according to claim 1, further comprising:

first drive means for moving the electrode holder along the axis of the electrode;

second drive means for moving the intermediate electrode guide along the axis of the electrode; and control means for controlling the first and second drive means so that the electrode holder and the intermediate electrode guide grasp the machining electrode, the electrode holder and the intermediate electrode guide keeping a fixed distance therebetween, so as to feed the machining electrode to the workpiece via the electrode guide.

27. An electric discharge machining (EDM) machine for a fine hole comprising:

a machining electrode for machining a fine hole in a workpiece by electric discharge;

an electrode holder mounting the machining electrode;

an electrode guide guiding the machining electrode toward a workpiece;

an axial flow nozzle disposed at the electrode holder;

working fluid supply means supplying a high-pressure working fluid of approximately 1.8 Mpa or more into the axial flow nozzle, thereby forming an axial flow about an axis of the machining electrode flowing toward the electrode guide, said axial flow guiding said machining electrode and imparting apparent rigidity to said machining electrode, between said electrode holder and said electrode guide.

28. An electric discharge machining (EDM) machine for a fine hole comprising:

a machining electrode for machining a fine hole in a workpiece by electric discharge;

an electrode holder mounting the machining electrode;

an electrode guide guiding the machining electrode toward a workpiece;

working fluid supply means supplying a working fluid;

an axial flow nozzle disposed at the electrode holder, said axial flow nozzle being supplied with working fluid from the working fluid supply means so as to form an axial flow about an axis of the machining electrode flowing toward the electrode guide; rotating means for rotating the axial nozzle about the axis of the machining electrode in synchronism with the machining electrode so as to rotate the axial flow about its axis, said axial flow guiding said machining electrode and imparting apparent rigidity to said machining electrode, between said electrode holder and said electrode guide.

29. An electric discharge machining (EDM) machine according to claim 12, in which the coating material is selected from the group consisting of a paraffin and a paradichlorobenzene.

* * * * *